(12) United States Patent
Joo et al.

(10) Patent No.: US 11,811,034 B2
(45) Date of Patent: Nov. 7, 2023

(54) MULTI-DOMAINED SULFUR ELECTRODES, AND MANUFACTURING THEREFOR

(71) Applicant: CORNELL UNIVERSITY, Ithaca, NY (US)

(72) Inventors: Yong Lak Joo, Ithaca, NY (US); Jaehyuk Lee, Ithaca, NY (US)

(73) Assignee: Cornell University, Ithaca, NY (US)

( * ) Notice: Subject to any disclaimer, the term of this patent is extended or adjusted under 35 U.S.C. 154(b) by 249 days.

(21) Appl. No.: 17/236,614

(22) Filed: Apr. 21, 2021

(65) Prior Publication Data

US 2021/0242513 A1    Aug. 5, 2021

Related U.S. Application Data

(63) Continuation of application No. 16/071,804, filed as application No. PCT/US2017/014324 on Jan. 20, 2017, now Pat. No. 11,018,385.

(Continued)

(51) Int. Cl.
| | |
|---|---|
| *H01M 10/52* | (2006.01) |
| *H01M 4/134* | (2010.01) |
| *H01M 4/136* | (2010.01) |
| *H01M 4/36* | (2006.01) |
| *H01M 4/62* | (2006.01) |

(Continued)

(52) U.S. Cl.
CPC ......... *H01M 10/52* (2013.01); *H01M 4/0419* (2013.01); *H01M 4/134* (2013.01); *H01M 4/136* (2013.01); *H01M 4/1397* (2013.01); *H01M 4/366* (2013.01); *H01M 4/38* (2013.01); *H01M 4/5815* (2013.01); *H01M 4/625* (2013.01); *H01M 4/663* (2013.01); *H01M 4/808* (2013.01)

(58) Field of Classification Search
None
See application file for complete search history.

(56) References Cited

U.S. PATENT DOCUMENTS

| | | | |
|---|---|---|---|
| 2011/0008531 A1 | 1/2011 | Mikhaylik et al. | |
| 2014/0045072 A1 | 2/2014 | Neumann et al. | |
| (Continued) | | | |

FOREIGN PATENT DOCUMENTS

| | | |
|---|---|---|
| CN | 102598364 A | 7/2012 |
| CN | 103460451 A | 12/2013 |
| (Continued) | | |

OTHER PUBLICATIONS

Niu et al., Nano Energy, 30 (2016) 138-145. (Year: 2016).*

(Continued)

*Primary Examiner* — Eli S Mekhlin
(74) *Attorney, Agent, or Firm* — Hodgson Russ LLP

(57) ABSTRACT

Provided herein are positive electrodes for lithium batteries, particularly lithium sulfur batteries, and the manufacture thereof. Particularly, such electrodes have good performance characteristics, such as capacity and capacity retention, even at very high loading of sulfur (e.g., >5 mg/cm2), as well as flexibility. Exemplary manufacturing techniques include the electrospraying of sulfur (e.g., electrode active sulfur compounds), and an optional additive (e.g., a nanostructured conductive additive), onto a porous, conductive substrate (e.g., a porous carbon substrate, such as comprising multiple layers and/or domains).

19 Claims, 17 Drawing Sheets

Related U.S. Application Data

(60) Provisional application No. 62/280,911, filed on Jan. 20, 2016.

(51) Int. Cl.
*H01M 4/04* (2006.01)
*H01M 4/66* (2006.01)
*H01M 4/1397* (2010.01)
*H01M 4/80* (2006.01)
*H01M 4/38* (2006.01)
*H01M 4/58* (2010.01)

(56) References Cited

U.S. PATENT DOCUMENTS

| | | |
|---|---|---|
| 2015/0372291 A1 | 12/2015 | Ryu et al. |
| 2017/0170511 A1 | 6/2017 | Yu et al. |

FOREIGN PATENT DOCUMENTS

| | | |
|---|---|---|
| CN | 103996828 A | 8/2014 |
| CN | 104157879 A | 11/2014 |
| CN | 105098143 A | 11/2015 |
| CN | 105122505 A | 12/2015 |
| JP | 2013-503439 A | 1/2013 |
| JP | 2013-504168 A | 2/2013 |
| JP | 2013-519187 A | 5/2013 |
| JP | 2015-506083 A | 2/2015 |
| JP | 2015128028 A | 7/2015 |
| JP | 2015128063 A | 7/2015 |
| JP | 2015230850 A | 12/2015 |
| KR | 10-2014-0048912 A | 4/2014 |
| KR | 10-2015-0088923 A | 8/2015 |
| KR | 10-2015-0143224 A | 12/2015 |
| KR | 10-2015-0143337 A | 12/2015 |
| WO | 2011/031297 A2 | 3/2011 |
| WO | 2013/130723 A1 | 9/2013 |
| WO | 2014149898 A1 | 9/2014 |

OTHER PUBLICATIONS

Wu et al., Materials Research Bulletin, 64 (2015). (Year: 2015).*
He, et al., J. Mater. Chem. A. 2015, 3, 18605-18610. (Year: 2015).
Lee, et al., Nano. Lett., 2015, 15, 2863-2868. (Year: 2015).
Li, et al., "Sulfur Embedded in a Mesoporous Carbon Nanotube Network as a Binder-Free Electrode for High-Performance Lithium-Sulfur Batteries," ACS NANO, vol. 10, No. 1, pp. 1300-1308, Apr. 12, 2015.
Database WPI, Week 201633, Thomson Scientific, AN 2015-79173J, 2016.
Fei, et al., Chem. Commun., 2016, 52, 1501-1504. (Year: 2016).

* cited by examiner

MULTI-DOMAINED SULFUR ELECTRODES, AND MANUFACTURING THEREFOR

CROSS-REFERENCE

This application is a continuation of U.S. application Ser. No. 16/071,804 filed Jul. 20, 2018, now issued as U.S. Pat. No. 11,018,385, which is a national phase entry of International Application number PCT/US2017/014324 filed Jan. 20, 2017, which claims the benefit of U.S. Provisional Application No. 62/280,911 filed 20 Jan. 2016, all of which are incorporated by reference in their entirety.

FIELD OF THE INVENTION

The field relates to lithium batteries, including positive electrodes therefor, particularly sulfur electrodes, and the manufacture thereof.

BACKGROUND OF THE INVENTION

Batteries comprise one or more electrochemical cell, such cells generally comprising a cathode, an anode and an electrolyte. Lithium secondary batteries are high energy density batteries that are fairly commonly used in consumer electronics and electric vehicles. In lithium secondary batteries, lithium ions generally move from the negative electrode to the positive electrode during discharge and vice versa when charging. The rechargeable battery industry has seen a rapid growth in recent years. Applications vary widely, and include large-scale banks of batteries for grid storage of intermittent renewable energy sources, as well as small-scale cells for wearable electronic devices. Despite the slow improvement in their performance, Li-ion batteries are still expected to apply to large size applications such as electric vehicles (EVs) and energy storage system (ESS).

SUMMARY OF THE INVENTION

To achieve further expansion of Li-ion batteries into various applications including EVs and ESS, their performance in terms of energy density and power density, rate capability, cycle-ability, and safety should be improved significantly. However, the progress of improving the energy density of Li-ion batteries has been impeded by the limited capacities (<240 mAhg$^{-1}$) of cathode materials based on Li metal oxides (e.g., $LiCoO_2$, $LiNi_{1-x}MxO_2$, $LiNi_xMn_y$-$Co_zO_2$). To overcome the limited capacities of conventional lithium-intercalation metal oxide cathode materials, new cathode materials based on sulfur embedment are introduced. The sulfur cathode has an astounding theoretical capacity of 1,675 mAh/g. In addition, sulfur is an inexpensive earth-abundant material, which makes it an even more attractive candidate as a cathode material. In certain embodiments provided herein are high capacity lithium secondary batteries with good cycling capabilities.

Other battery design is not compatible with deformation of the battery cell due, e.g., to the use of two metal foil current collectors and brittle electrode coatings. In some instances, the metal foil current collectors bent, the electrode material would be cracked in that area, resulting in large dead zones within the cell. In some instances herein are high capacity lithium secondary batteries that eliminate one or both of the metal foil current collectors to achieve greatly improved ability to withstand battery deformation. In some instances, provided herein are batteries comprising a flexible carbon substrate, that allows such batteries to be configured in a thin and flexible construct. As such, in some embodiments, batteries provided herein are capable of being incorporated into garments and wearable devices. Provided in some instances herein are batteries, including a new class of flexible batteries capable of bending and deforming far beyond the range of what is currently available is developed, as well as electrodes thereof, manufacturing thereof, precursors thereof, components thereof, and the like. Combined with the high-energy battery chemistries discussed, these batteries constitute a marked improvement over existing battery technology. In other embodiments, such as wherein flexibility is not necessary, metal current collectors (e.g., metal foil current collectors) are utilized.

In certain embodiments, provided herein is a lithium battery (e.g., lithium sulfur battery) comprising a negative electrode, a separator, and a positive electrode. In specific embodiments, the positive electrode comprises a three dimensional porous substrate (e.g., a conductive substrate, such as a carbon substrate, aluminum substrate, or the like). In specific instances, the substrate functions alone, or in combination with another material as a current collector for the electrode. In other embodiments, an additional conductive (e.g., metal) substrate is provided (e.g., with the carbon substrate deposited, positioned, or otherwise placed thereon or in contact therewith). In some embodiments, the three-dimensional porous carbon substrate comprises a plurality of macrostructured voids (e.g., pores) therein. In certain embodiments, the positive electrode further comprises sulfur (e.g., referring to herein as active sulfur material, such as in the form of elemental sulfur, a sulfide, a polysulfide, or a sulfur compound, such as an electrode active sulfur containing compound). In specific embodiments, the pores (e.g., macrostructured voids) of the three-dimensional porous substrate are infused with the sulfur. In some embodiments, the positive electrode further comprises an additive. In specific instances, the additive is a carbonaceous or conductive additive, such as a (e.g., nanostructured) carbon material (e.g., carbon black, a graphene (e.g., graphene or a graphene analog, such as described herein), carbon nanotubes, analogs thereof, or the like). In specific instances, a nanostructured carbon material has at least one, or an average, dimension of about 1 micron or less (e.g., about 1 nm to about 500 nm, about 5 nm to about 250 nm, or the like). For example, in certain embodiments, nanostructured graphene or graphene analog provided herein has a nanoscale (e.g., less than 1 micron) thickness, while having a macroscale lateral dimension (e.g., length and/or width), such as about 1 micron to about 500 micron. In some embodiments, the pores (e.g., macroporous voids) of the three dimensional porous carbon substrate comprising carbonaceous or conductive additive deposited therein (e.g., at the opening of the pore or void, such as at the surface of the substrate, such as the surface in proximity to the separator). In certain embodiments, the additive functions to (a) facilitate retention of sulfur infused within the porous substrate; and/or (b) improve conductivity and/or electron mobility of the substrate or electrode, generally. In general configurations, the separator is positioned between the negative electrode and the positive electrode.

In specific embodiments, provided herein is a lithium battery (e.g., lithium sulfur battery) comprising a negative electrode, a separator, and a positive electrode, the positive electrode comprising a three dimensional porous carbon substrate, the three-dimensional porous carbon substrate comprising a mesoporous carbon (e.g., powder, paper, fibers) and a substrate surface. In specific embodiments, a sulfur compound, such as provided herein, is infused into at least a portion of the porous carbon. In more specific embodiments, a carbonaceous additive (e.g., graphene oxide or reduced graphene oxide) is deposited or coated on the surface of the porous carbon substrate. In some instances, the deposited or coated carbonaceous additive forms a film on the surface of the substrate. In further or alternative embodiments, the carbonaceous additive is deposited (e.g., with good uniformity) over the surface of the substrate, including within the porous structures found on the surface of the substrate, e.g., thereby forming a multi-domained substrate structure infused with sulfur (e.g., wherein the multi-domained substrate structure comprises a first domain comprising naked substrate and a second domain comprising substrate in combination with a carbonaceous additive). In specific embodiments, the separator of the batter is positioned between the negative electrode and the positive electrode, e.g., wherein the surface of the substrate with the additive deposition or coating thereon is positioned facing or in proximity to the separator.

In certain embodiments, the three-dimensional porous substrate comprises a first domain or layer and a second domain or layer. In some embodiments, the second domain or layer is less porous than the first domain or layer. In specific embodiments, the first domain or layer comprising a plurality of macrostructured voids therein. In further or alternative embodiments, the second domain or layer is less porous and/or comprises smaller pores (e.g., on average) than the first domain or layer. In specific embodiments, the second domain or layer comprises a plurality of meso- and/or micro-structured voids therein. In certain embodiments, the three-dimensional porous substrate is an asymmetric porous substrate comprising a course porous layer (less density, larger and/or more pores) and a dense porous layer (e.g., higher density, fewer and/or smaller pores). In some embodiments, the three dimensional porous substrate is a macroporous substrate comprising a macroporous domain and a mesoporous and/or microporous domain, the mesoporous and/or microporous domain comprising a macroporous substrate, the pores of which are at least partially filled with a (e.g., nanostructured) additive (e.g., carbonaceous or conductive additive described herein).

In further or alternative embodiments, an electrode provided herein comprises a three-dimensional porous carbon substrate with an additive on (e.g., deposited on) a surface thereof (e.g., coated thereon, such as by an electrospray technique described herein). In certain embodiments, a first three-dimensional porous carbon substrate and additive collectively combine to form a second three-dimensional porous carbon substrate that comprises a first domain and a second domain. In specific embodiments, the second domain comprises an additive (e.g., carbonaceous or conductive additive) deposited within the macrostructured voids of the substrate thereof. In more specific instances, the first substrate and the additive (e.g., nanostructured, conductive, and/or carbonaceous additive) collectively form a plurality of meso- and/or micro-structured voids (e.g., collectively forming the second domain of the second substrate), whereas the first domain (e.g., lacking additive) comprises a plurality of macroporous voids (e.g., within which sulfur is infused).

In specific embodiments, provided herein is a (e.g., three dimensional) mesoporous carbon substrate (e.g., mesoporous carbon powder, mesoporous carbon nanopowder (e.g., comprising powder particulates having an average dimension of less than 2 micron), mesoporous carbon fibers, mesoporous carbon nanofibers, mesoporous carbon paper, or the like). In certain embodiments, the mesoporous substrate comprises mesoporous voids (e.g., pores having a dimension of between 2 nm and 50 nm) within the substrate material and macroporous voids (e.g., having a dimension of greater than 50 nm) between substrate structures (e.g., between powder particulates or fiber structures). In further embodiments, the mesoporous substrate comprises microporous voids (e.g., pores having a dimension of less than 2 nm) within the substrate material. In certain embodiments, the mesporous carbon substrate collectively has a surface with an additive (e.g., a carbonaceous additive, such as graphene or an analog thereof) coated on infused in a surface thereof. In certain embodiments, at the surface of the substrate, the additive at least partially fills, coats, or otherwise incorporates within some or all of the voids or pores on the surface of the substrate (e.g., reducing the surface porosity of the substrate) (e.g., thereby forming a second—less porous—domain of the substrate). In some embodiments, an electrode provided herein comprises such a mesoporous carbon substrate coated and/or surface infused with an additive, with an active sulfur compound infused in the substrate (e.g., in the macro-, meso-, and/or micro-pores thereof).

In specific embodiments of electrodes (e.g., cathodes) herein, the second (or less porous) domain is positioned between the separator and the first (or more porous) domain, such as to reduce and/or eliminate sulfur loss from the positive electrode (e.g., by positioning the less porous domain toward the separator). In some embodiments, the first domain comprises carbonaceous or conductive additive deposited into at least a portion of the pores thereof. In specific instances, such additive in the macroporous domain facilitates conductivity (and/or electron mobility) of the macroporous domain. In some embodiments, the additive is included in the macroporous domain in an amount sufficient to improve conductivity while not overly decreasing the porosity thereof, so as to overly decrease sulfur loading capabilities thereof. Thus, in some embodiments, some or all of the macroporous voids of the first domain are smaller than the macroporous voids of the substrate and/or the density of the first domain is greater than the density of the substrate in the absence of the additive.

In some embodiments, the second layer or domain is positioned between the first layer or domain and the separator. In certain embodiments, the substrate, and/or the first layer or domain has a void fraction porosity of about 10% or more (e.g., about 20% or more, about 30% or more, about 50% or more, about 70% or more, or the like). Generally, a void fraction porosity as discussed herein refers to the fraction of the total volume in which fluid flow may occur (e.g., excluding closed pores that are not accessible cavities). In some instances, such porosity is optionally determined in any suitable manner, such as by direct methods, such as by determining the bulk volume of the porous material (e.g., by fluid displacement of the material), and then determining the volume of the skeletal material with no pores (pore volume=total volume−material volume, with the void fraction porosity being {pore volume/total volume}*100%). In certain embodiments, the macrostructured voids (e.g., voids having at least one dimension of about 50 nm or more, such as about 50 nm to about 500 micron) constitute about 20% or more (e.g., about 30% or more, about 40% or more, about 50% or more, about 60% or more, about 70% or more, or the like) of the void fraction porosity of the first layer or domain, and/or of the substrate.

In further or alternative embodiments, the second layer or domain has a void fraction porosity of about 10% or more (e.g., about 20% or more, about 30% or more, about 40% or more, about 50% or more, or the like). In some embodiments, the microstructured voids (e.g., having at least one dimension of about 10 nm or less, e.g., about 5 nm or less, or about 2 nm or less) constitute about 20% or more (e.g., about 30% or more, about 40% or more, about 50% or more, about 60% or more, about 70% or more, or the like) of the void fraction porosity of the second layer or domain. In certain embodiments, the second layer or domain has a porosity that is 90% or less, 80% or less, 60% or less, 50% or less, 40% or less, 20% or less, or the like than the porosity of the first layer or domain.

In various embodiments, any suitable substrate is optionally utilized. In general embodiments, the substrate is a porous substrate, such as described herein. In specific embodiments, the substrate is a porous carbon substrate, such as comprising a carbon nanotube (CNT) paper, a carbon fiber paper (CFP), a gas diffusion layer (GDL) membrane, a carbon fiber mat (with or without thermal treatment), or a combination thereof.

In certain embodiments, the first layer or domain is coarsely porous, such as having a density of about 1 g/cm$^3$ or less, such as 0.05 g/cm$^3$ to about 1 g/cm$^3$. In further or alternative embodiments, the second layer or domain is densely porous, e.g., relative to the first layer or domain, i.e., the density of the second layer or domain is greater than the density of the first layer or domain. In specific embodiments, the density of the second layer or domain (e.g., a dense substrate itself, or a less dense substrate a layer or domain of which has its density increased by deposition of an additive, such as (e.g., nanostructured) additive into and/or onto a surface of at least a portion of the porous structure thereof) is more dense (e.g., at least 110% more dense, at least 150% more dense, at least 200% more dense, at least 300% more dense, or the like) than the first layer or domain. In certain embodiments, the second layer or domain has a density of about 0.2 g/cm$^3$ or more, such as about 2 g/cm$^3$. Generally, the density of the first layer or domain is sufficient to facilitate infusion of sulfur therein, and the second layer or domain is sufficient to prevent or retard leeching or mobility of sulfur (or electrolyte soluble polysulfides) therethrough (e.g., while not being so dense or non-porous to prevent or retard lithium ion mobility therethrough).

The lithium battery of any one of the preceding claims, wherein the second three-dimensional porous carbon substrate comprises an additive, such as a nanostructured (e.g., conducting) additive. In specific embodiments, the additive is (e.g., nanostructured) carbon, such as described herein, e.g., a graphene, carbon black, carbon nanotubes, or the like. In specific embodiments, the additive at least partially fills the pores of the surface of a substrate, such as forming a web on the surface of the substrate. In specific instances, such a configuration provides a dense and/or less porous (e.g., microporous) layer or domain. In specific embodiments, a domain, or a plurality of domains (e.g., a first and a second domain) of the three-dimensional porous carbon substrate comprises a porous substrate material and an additive deposition thereon (e.g., within the porous voids thereof). In certain embodiments, the additive deposition reduces the effective porosity of and/or increases the effective density of the porous substrate material of the three-dimensional porous carbon substrate domain. In some embodiments, such as wherein conductive additive is utilized, the additive deposition increases conductivity of the substrate and/or electrode, increases electron mobility of the substrate and/or electrode, and/or improves cycling characteristics of the electrode. In some instances, while a battery provided herein may comprise a negative electrode current collector, such as a metal (e.g., aluminum or copper) foil, the conductivity of the positive electrode (e.g., wherein a conductive substrate and conductive additive are utilized therein), an addition a positive electrode current collector (e.g., beyond the substrate and additive described herein, such as a metal current collector, e.g., metal foil) is not required (e.g., as the carbon substrate, and/or conductive additive, function as a current collector).

In certain embodiments, highly porous domains of a substrate or layer thereof provided herein facilitate high loading of sulfur therein, while more dense domains of a substrate or layer thereof provided herein facilitate retention of the sulfur (and electrolyte soluble polysulfides during cycling) highly loaded into the highly porous domain. In some embodiments, thin electrodes with high capacity (e.g., and sulfur loading) are provided herein. In certain embodiments, a positive electrode provided herein has a thickness of about 5 mm or thinner, e.g., about 3 mm or thinner, about 2 mm or thinner, about 0.02 mm to about 1 mm, or about 0.1 mm to about 1 mm. In certain embodiments, the ability to control the thickness of the electrode, while retaining good capacity per unit area of the electrode facilitates the production of electrodes with tunable characteristics. In some instances, provided herein is an electrode and/or battery having good flexibility, such as allowing for use in wearable electronics. In some embodiments, a battery (e.g., lithium sulfur battery) provided herein is flexible (e.g., wherein the flexible battery is distortable (e.g., bendable) by a pressure of less than 200 psi (e.g., less than 150 psi, less than 100 psi, or the like), such as by at least 5 degrees, at least 10 degrees, at least 15 degrees, at least 30 degrees, at least 45 degrees, at least 90 degrees, or more.

In certain embodiments, a positive electrode provided herein has good sulfur loading per unit area, even when using thin substrate materials, such as discussed herein. In some embodiments, a positive electrode provided herein comprises about 3 mg$_{sulfur}$/cm$^2_{electrode}$ or more. In more specific and preferred embodiments, the positive electrode comprises about 5 mg/cm$^2$ or more (e.g., about 6 mg/cm$^2$ or more, about 7 mg/cm$^2$ or more about 8 mg/cm$^2$ or more, about 10 mg/cm$^2$ or more, or the like) of sulfur (e.g., infused therein). In certain embodiments, even at high sulfur loading, positive electrodes provided herein exhibit good specific capacities and good capacity retention. In some embodiments, the specific capacity of a positive electrode provided herein has a specific capacity of the positive electrode is at least 200 mAh/g (e.g., at least 500 mAh/g, at least 700 mAh/g, at least 1,000 mAh/g, at least 1,250 mAh/g, or the like), such as at a charge and/or discharge rate of about 0.25 C or more (e.g., up to charge and/or discharge rates of up to 1 C, 2 C, or even 3 C or more, wherein C is the rate required to completely charge or discharge the cell in one hour). In certain embodiments, capacity retention is at least 60%, at least 80%, at least 85%, at least 90%, or more after cycling, such as after 50 cycles, after 100 cycles, after 200 cycles, after 300 cycles, or the like.

Also provided herein are materials, such as can be used as a precursor to a positive electrode described herein. In some embodiments, such a material (or composition of matter) comprises (i) a three dimensional porous substrate (e.g., a conductive porous substrate, such as a porous carbon substrate); (ii) sulfur; and (iii) a (e.g., nanostructured) conductive additive (e.g., a nanostructured carbon). In specific embodiments, the porous substrate is a macroporous substrate, comprising a plurality of macrostructured voids therein. In certain embodiments, the sulfur and additive is deposited on the surface of the substrate, e.g., concurrently or sequentially. In some embodiments, the sulfur and additive are deposited on the surface of the substrate in any suitable manner, such as by electrospray techniques described herein. In certain embodiments, the material further comprises a solvent (e.g., on the surface of the substrate), such as carbon disulfide, alcohol, and/or other solvents, such as described herein. In some instances, sulfur is dissolved in the solvent and/or additive is suspended in the solvent. In certain instances, use of a solvent facilitates infusion of the sulfur into the porous substrate, even in instances wherein smaller pore structures are present (e.g., formed by the combination of a porous substrate and additive), such as microporous structures, and infusion of the substrate occurs through the smaller pore structures. In certain embodiments, the substrate is or comprises a macroporous porous domain or layer. In specific embodiments, the substrate is an asymmetric porous substrate comprising a first layer and a second layer, the first layer being more porous and/or less dense than the second layer. In more specific embodiments, the first layer or domain comprises the plurality of macrostructured voids therein, and a second layer or domain comprises a plurality of microstructured voids therein.

In certain embodiments, provided herein is a process for manufacturing an electrode (e.g., lithium-sulfur battery cathode). In specific embodiments, the electrode comprises (a) a porous carbon substrate, and (b) sulfur. In more specific embodiments, the electrode further comprises an additive, such as a conducting and/or nanostructured additive (e.g., carbon), such as described herein. In some embodiments, the process comprises producing an electrostatically charged plume from a fluid stock. In specific embodiments, the plume comprises a plurality of (e.g., nanoscale, such as having an average dimension of less than 1 micron, e.g., about 1 nm to about 1 micron) droplets and/or particles (e.g., comprising sulfur, additive, and/or solvent). In specific embodiments, production of the electrostatically charged plume comprises:

a. providing the fluid stock to a first inlet of a first conduit of an electrospray nozzle, the first conduit being enclosed along the length of the conduit by a wall having an interior surface and an exterior surface, the first conduit having a first outlet, and the fluid stock comprising (i) a sulfur compound, a carbonaceous or conductive additive, or a combination thereof, and (ii) a liquid medium (e.g., solvent); and b. providing a voltage to the nozzle (e.g., wall of the first conduit), e.g., the voltage providing an electric field and/or applying an electrostatic charge to the fluid stock (e.g., at the first outlet).

In specific embodiments, the fluid stock comprises sulfur. In other specific embodiments, the fluid stock comprises an additive (e.g., carbonaceous or conductive additive). In more specific embodiments, the fluid stock comprises both sulfur and a carbonaceous or conductive additive. In further or alternative embodiments, the process comprises producing a first plume from a first fluid stock and a second plume from a second fluid stock, the first fluid stock comprising either a sulfur compound or a carbonaceous or conductive additive and the second fluid stock comprising the other of a sulfur compound or a carbonaceous or conductive additive. In more specific embodiments, the first fluid stock comprises both sulfur and a conductive additive (e.g., a conductive carbon additive, such as carbon black), and the second fluid stock comprises a carbonaceous additive (e.g., an oxidized graphenic component, such as graphene oxide).

In certain embodiments, the process further comprises collecting one or more deposition on a porous carbon substrate, the deposition(s) comprising sulfur and/or a carbonaceous or conductive additive. Specifically, when a first and second fluid stock are electrosprayed, a first and a second deposition are collected on the substrate. In specific embodiments, at least portion of solvent from the fluid stock is also present in the deposition (e.g., in the sulfur containing fluid stocks, such as to facilitate good infusion of the sulfur compound into the substrate). In some instances, some or most of the solvent from the fluid stock is evaporated during the electrospray process (e.g., in additive containing fluid stocks, such as to facilitate good retention of the additive at or near the substrate surface), but some remains upon deposition. In some embodiments, it is preferred that some solvent remains upon deposition, so as to facilitate infusion of sulfur into the substrate. In specific embodiments, a solvent in which the sulfur used is highly soluble is preferred (e.g., elemental sulfur, sulfides, and/or polysulfides in carbon disulfide), e.g., such that even with majority loss of solvent during the electrospray processes, the remaining solvent is sufficient to facilitate infusion of the substrate. In certain embodiments, a process provided herein further comprises infusing the sulfur into the porous substrate or allowing the sulfur of the sulfur deposition to infuse into the porous (e.g., carbon) substrate.

In preferred embodiments, the electrospray process described herein is gas assisted or controlled. In specific embodiments, the process comprises injecting electrostatically charged fluid stock into a stream of gas, such as to provide an electrostatically charged plume described herein. In some embodiments, the process comprises providing a pressurized gas to a second inlet of a second conduit of a nozzle (e.g., wherein a fluid stock is provided to a first inlet of a first conduit, the second conduit being positioned around the first conduit). The gas is optionally provided to the nozzle at any suitable pressure, such as to provide a high velocity gas at a second outlet of the second conduit. In specific embodiments, the high velocity gas having a velocity of about 0.5 m/s or more, about 1 m/s or more, about 5 m/s or more, or about 50 m/s or more. Any suitable configuration is optionally utilized, such as wherein the second conduit is enclosed along the length of the conduit by a second wall having an interior surface, the second conduit having a second inlet and a second outlet, the second conduit having a second diameter, and the first conduit being positioned inside the second conduit, the exterior surface of the first wall and the interior surface of the second wall being separated by a conduit gap. In certain embodiments, the ratio of the conduit overlap length to the first diameter is about 1 to 100, e.g., about 10. In certain embodiments, the first diameter is about 0.05 mm to about 5 mm (e.g., wherein $V_{DC}$ is used), or about 1 mm or more, or about 10 mm or more (e.g., wherein $V_{AC}$ is used). In some embodiments, the second diameter is about 0.1 mm to about 10 mm. In certain embodiments, the conduit gap is about 0.5 mm or more (e.g., wherein $V_{DC}$ is used), or about 1 mm or more (e.g., wherein $V_{AC}$ is used). In some embodiments, a voltage applied to the nozzle is about 8 $kV_{DC}$ to about 30 $kV_{DC}$. In specific embodiments, the voltage applied to the nozzle is about 10 $kV_{DC}$ to about 25 $kV_{DC}$. In other embodiments, the voltage applied to the nozzle is about 10 $kV_{AC}$ or more (e.g., about 15 $kV_{AC}$ or more, or about 20 $kV_{AC}$ to about 25 $kV_{AC}$). In certain embodiments, the alternating voltage ($V_{AC}$) has a frequency of about 50 Hz to about 350 Hz. In some embodiments, the fluid stock is provided to the first inlet at a rate of about 0.01 mL/min or more, e.g., about 0.03 mL or more, about 0.05 mL or more, about 0.1 mL or more, or any suitable flow rate.

In certain embodiments, a fluid stock, plume, deposition, electrode, or the like provided herein comprises any suitable amount of sulfur and additive. In some embodiments, high sulfur loading is preferred for good capacity, while only small amounts of additive are required, such as improve cycling capabilities (e.g., by retarding sulfur loss from the electrode and improving the conductivity of the substrate). In specific embodiments, the ratio of active sulfur material to additive (e.g., carbon inclusion or nano-inclusion) (e.g., in a fluid stock provided herein, or a precursor, loaded substrate, or electrode herein, such as based on aereal loading by weight) is about 1:1 to about 1000:1, e.g., about 2:1, about 2:1 to about 500:1, about 8:2 (4:1) to about 99:1, or the like.

Also provided in specific embodiments herein is a process for producing an electrode, the process comprising producing a plume or aerosol from a fluid stock (e.g., by coaxially electrospraying a fluid stock with a gas, thereby forming a jet and/or a plume, e.g., the gas at least partially surrounding the jet or expelled (e.g., from an electrospray nozzle) in a similar mean direction as the plume (e.g., within 30 degrees, within 15 degrees, or the like)), the plume comprising a plurality of droplets (e.g., nanodroplets), the fluid stock, the jet, and the plume comprising a liquid medium, sulfur and/or an additive, the additive comprising (e.g., nanostructured) carbon inclusions. In specific embodiments, the sulfur and additive are in a single fluid stock or in separate fluid stocks, which are individually produced into an aerosol or plume as described herein. In other specific embodiments, provided herein is a process for producing an electrode, the process comprising (a) injecting an electrostatically charged fluid stock into a gas stream, thereby forming a plume (e.g., aerosol), the plume comprising a plurality of particles, the electrostatically charged fluid stock comprising a liquid, sulfur, and an optional additive, the optional additive comprising (e.g., nanostructured) carbon inclusions, and (b) collecting the plurality of particles onto a porous carbon substrate. In specific embodiments, the optional additive is absent. In further or additional specific embodiments, the process further comprises injecting a second electrostatically charged fluid stock into a second gas stream, thereby forming a second plume (e.g., aerosol), the second plume comprising a plurality of second particles (e.g., droplets of varying degrees of dryness), the second electrostatically charged fluid stock comprising a second liquid and an additive, the additive comprising (e.g., nanostructured) carbon inclusions (e.g., graphene or an analog thereof, such as graphene oxide (GO) or reduced graphene oxide (rGO), and (b) collecting the second plurality of particles onto the porous carbon substrate (e.g., prior to or following deposition of the first plurality of particles thereon).

These and other objects, features, and characteristics of the batteries, electrodes, materials, compositions and/or processes disclosed herein, will become more apparent upon consideration of the following description and the appended claims with reference to the accompanying drawings and examples, all of which form a part of this specification. It is to be expressly understood, however, that the drawings and examples are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION OF THE INVENTION

Figure 1:
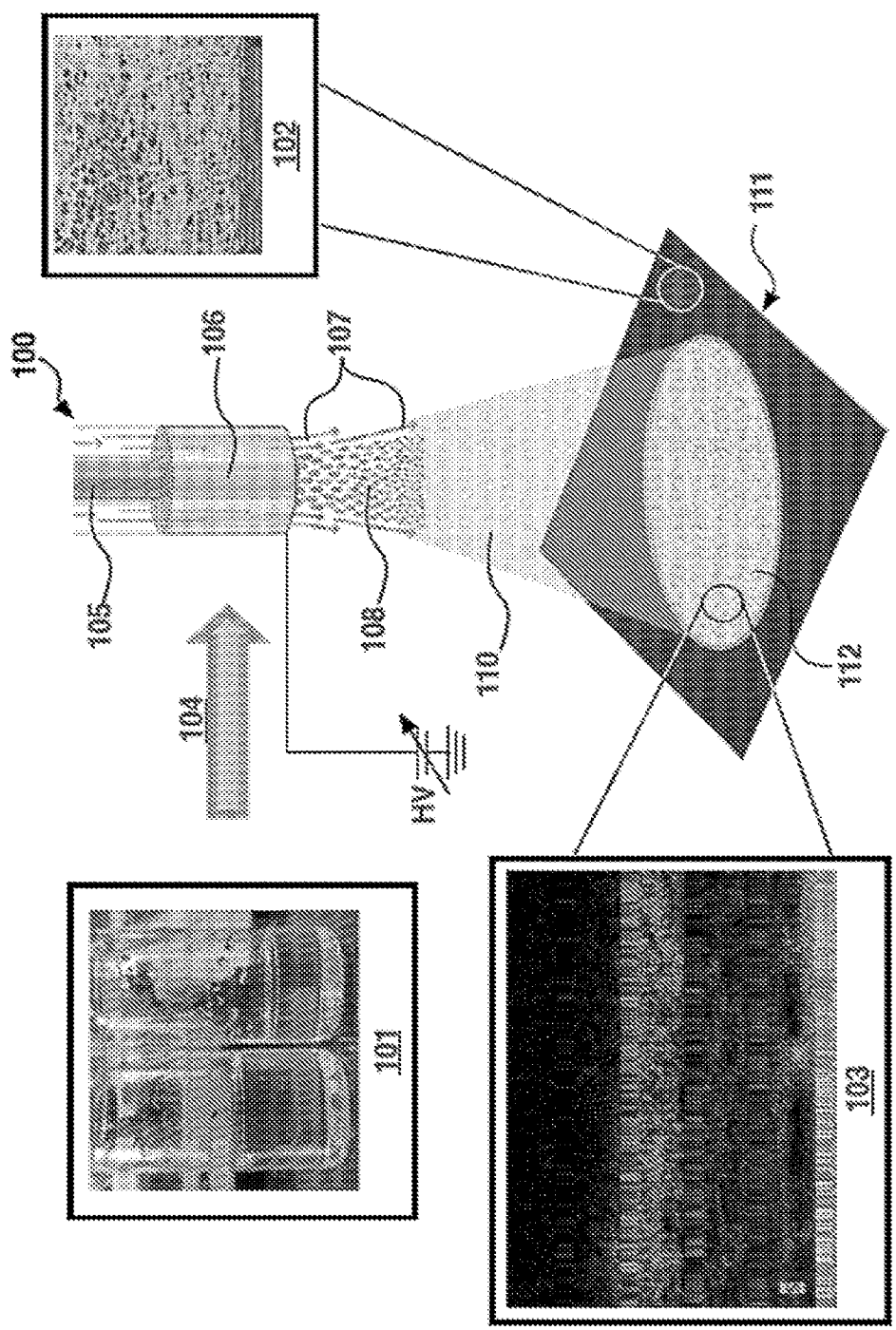
FIG. 1 illustrates a process for manufacturing an electrode according to the processes described herein.

Provided in certain embodiments herein are energy storage devices (e.g., lithium batteries, such as lithium-sulfur batteries), electrodes, electrode materials, other materials (such as those useful in preparing electrodes and/or electrode materials), and methods of manufacturing the same. In specific embodiments, the energy storage device comprises and electrode and/or electrode materials described herein and/or prepared according to the manufacturing processes described herein.

In some embodiments, an electrode or electrode material provided herein comprises a substrate and sulfur (referring to, herein, as an electrode active sulfur compound or material, such as a sulfur allotrope (elemental sulfur), sulfide, polysulfide, combinations thereof, or the like, such as described herein). In specific embodiments, the substrate is a multi-layered or multi-domain substrate (e.g., a porous carbon substrate comprising multiple layers and/or multiple domains thereof). In specific embodiments, an electrode comprising a multilayered substrate comprises a sulfur infused asymmetric carbon substrate, the carbon substrate comprising multiple layers or domains thereof. In specific embodiments, the substrate comprises at least two layers or domains, such as wherein the first layer or domain is a course porous layer and the second layer is a dense porous layer (e.g., having less porosity and/or smaller pore sizes than the first layer or domain). In some instances, the course porous layer facilitates high sulfur loading, and the dense porous layer facilitate capacity retention (and/or retention of sulfur—particularly electrolyte soluble polysulfides that are formed during cell cycling—by or at the electrode).

In certain embodiments, an electrode or electrode material substrate provided herein comprises a first layer or first domain comprising a conductive material (e.g., to facilitate electrical conductivity, rate capability, and/or eliminate the need for an additional current collector component in a cell). Any suitable substrate is optionally used, such as carbon substrate, preferably a porous carbon substrate. In some embodiments, the first layer or first domain of the substrate comprises a porous (e.g, macro- and/or meso-porous) structure suitable for receiving, and/or being infused with sulfur. In certain embodiments, the first layer or first domain of the substrate has any suitable thickness, such as about 10 micron to about 10 mm, e.g., about 75 micron or more, about 100 micron to about 1 mm, about 100 micron to about 500 micron, or about 200 micron to about 400 micron.

In some embodiments, the first layer or first domain of the substrate has a void fraction porosity of about 10% or more (e.g., about 20% or more, about 30% or more, about 40% or more, about 50% or more, or the like). In some embodiments, macrostructured pores (e.g., voids having at least one dimension, or an average dimension, of about 50 nm or more, such as about 50 nm to about 500 micron) and/or mesopores (e.g., voids having at least one dimension, or an average dimension, of about 2 nm to about 50 nm) constitute about 20% or more (e.g., about 30% or more, about 40% or more, about 50% or more, about 60% or more, about 70% or more, or the like) of the void fraction porosity of the three dimensional porous substrate (e.g., of the first layer or first domain thereof) (e.g., porous carbon substrate). In specific embodiments, macrostructured pores (e.g., voids having at least one dimension, or an average dimension, of about 50 nm or more, such as about 50 nm to about 500 micron) constitute about 20% or more (e.g., about 30% or more, about 40% or more, about 50% or more, about 60% or more, about 70% or more, or the like) of the void fraction porosity of the three dimensional porous substrate (e.g., of the first layer or first domain thereof) (e.g., porous carbon substrate).

In certain embodiments, more porous substrates (e.g., comprising larger pore sizes) are desired such as to facilitate high sulfur loading into the substrate (e.g., first layer or first domain thereof). In some instances, however, porosity readily leads to migration of sulfur out of the electrode material, which may lead to loss of capacity in a cell and/or even cell death.

In certain embodiments, electrodes provided herein further comprise a second layer or domain. In some embodiments, the substrate comprises a first layer of a first porous material and a second layer of a second material, wherein the porosity of the first and second layers is different. In specific embodiments, the first and second materials are optionally the same or different. For example, while the first and second materials may both comprise porous carbon, the first material may be carbon paper, whereas the second material is a nanofiber mat comprising mesoporous nanofibers. In other embodiments, the substrate comprise a porous material, wherein the pores of at least one surface thereof are at least partially blocked with an additive (e.g., thereby reducing the effective porosity and or average pore size of the substrate at the at least one surface thereof), e.g., wherein a first domain of the substrate is more porous (e.g., coursely porous) and a second domain of the substrate is less porous (e.g., a densely porous domain)—e.g., as a result of the additive at least partially reducing the effective porosity and/or average pore size of the second domain. In some embodiments, the additive is a conductive additive, whereby the additive is useful, in some instances, for not only reducing the porosity and/or pore size at the surface of the porous substrate, but also improving the conductivity thereof (e.g., electrical conductivity, such as improving the rate capabilities of an electrode comprising the such a substrate). In specific embodiments, the substrate comprises a second layer (e.g., porous material) coated or deposited on the first layer of the substrate, or otherwise positioned between the first layer of the substrate and a separator of a cell comprising an electrode described herein. In specific instances, the second layer of the substrate is a porous (e.g., meso- and/or micro-porous) layer. In some embodiments, the average dimensions of the pores of the second layer or domain are smaller than the average dimensions of the pores of the first layer or domain. In specific instances, the smaller pores facilitate transfer of lithium ions, while retarding the transfer of sulfur therethrough. In certain embodiments, the loss of sulfur is reduced by at least 10%, at least 20%, at least 30%, at least 40%, at least 50%, at least 60%, at least 70%, at least 80%, at least 90%, at least 95%, or more relative to an otherwise identical electrode when cycled in a cell (e.g., lithium battery cell, such as a lithium-sulfur cell) lacking the second layer or domain after a number of cycles (e.g., after 10 cycles, after 20 cycles, after 50 cycles, after 100 cycles, after 150 cycles, or more). In some embodiments, the second layer or domain comprises a dense porous (e.g., macro- and/or meso-porous) structure suitable for retaining and/or prohibiting or reducing the free flow of sulfur (e.g., out of the electrode material). In certain embodiments, the second layer or domain has any suitable thickness, such as about 1 micron to about 250 micron, e.g., about 5 micron to about 200 micron, or about 10 micron to about 100 micron.

In certain embodiments, the porosity of the first layer or domain to the porosity of the second layer or domain is at least 1:1, e.g., at least 1.5:1, at least 2:1, at least 3:1, at least 4:1, at least 5:1, at least 7:1, at least 10:1, or the like. In some embodiments, the average pore size of the first layer or domain to the average pore size of the second layer or domain is at least 1:1, e.g., at least 1.5:1, at least 2:1, at least 3:1, at least 4:1, at least 5:1, at least 7:1, at least 10:1, or the like. In certain embodiments, the density of the second layer or domain to the density of the first layer or domain is at least 1:1, e.g., at least 1.5:1, at least 2:1, at least 3:1, at least 4:1, at least 5:1, at least 7:1, at least 10:1, or the like.

In some embodiments, the second layer or domain has a void fraction porosity of about 10% or more (e.g., about 20% or more, about 30% or more, about 40% or more, about 50% or more, or the like). In certain embodiments, microstructured pores (e.g., having at least one, or an average, dimension of about 10 nm or less, e.g., about 5 nm or less, or about 2 nm or less) constitute about 20% or more (e.g., about 30% or more, about 40% or more, about 50% or more, about 60% or more, about 70% or more, or the like) of the void fraction porosity of the second layer or domain.

In specific embodiments, the first layer or domain and second layer or domain (and/or any additional layer) of the substrate are three-dimensional structures, layers or domains, having a length, a width, and a thickness. Generally, the second layer or domain covers the first layer or domain of the substrate fairly well, e.g., so as to maximize sulfur retention at the electrode, and such dimensions are generally a function of the ultimate cell in which the electrode is to be used, and the electrode packing configuration thereof. The thicknesses of the first layer or domain and second layer or domain may, however, differ. In specific instances, it is desirable to have a first layer or domain thickness suitable to allow sufficient infusion of sulfur therein. In some instances, the second layer or domain has a thickness sufficient to adequately retard the loss of sulfur therethrough (e.g., while not overly retarding the flow of lithium therethrough and/or diminishing the overall sulfur loading capability of the substrate when the sulfur is loaded concurrently with or after additive deposition). In certain embodiments, the thickness of the first layer or domain is greater than the thickness of the second layer or domain, e.g., the ratio of the thickness of the first layer or domain to thickness of the second layer or domain being at least 1:1, e.g., at least 2:1, at least 3:1, at least 4:1, at least 5:1, at least 7:1, at least 10:1 or the like. In certain embodiments, first layer or domain has larger pores on average, is more porous (e.g., by void fraction), and/or is less dense than the second layer or domain. In specific embodiments, the first layer or domain has a density of about 0.1 $g/cm^3$ to about 1 $g/cm^3$. In further specific embodiments, the second layer or domain has a density of about 0.1 $g/cm^3$ or more, such as about 0.2 $g/cm^3$ to about 2 $g/cm^3$.

As discussed herein, in certain embodiments, the first layer or domain is a conductive substrate, e.g., comprising carbon. In specific embodiments, the first layer or domain is a carbon substrate comprising, e.g., carbon nanotube (CNT) paper, a carbon fiber paper (CFP), a carbon fiber mat, mesoporous carbon (e.g., pitted mesoporous carbon), or the like.

In some embodiments, the second layer or domain is also a conductive substrate. In certain embodiments, the second layer or domain comprises a carbon material, such as a carbon allotrope. In some embodiments, the second layer or domain comprises a carbon web. In specific embodiments, the second layer or domain comprises conductive carbon, such as conductive nanostructured carbon. In some embodiments, the second domain comprises the same porous substrate (e.g., carbon substrate) of the first domain and an additive, the additive at least partially reducing the porosity and/or average pore size, and/or increasing the density of the substrate in the second domain. In some embodiments, the second layer or domain comprises carbon black (e.g., Super P™), graphene, a graphene analog, (e.g., graphene oxide, reduced graphene oxide, graphene nanoribbons (GNR), or the like), carbon nanotubes (CNT), or the like, or any combination thereof.

In certain embodiments, an electrode or electrode material provided herein has any suitable characteristic(s). In some embodiments, the substrate systems (e.g., porous carbon substrate systems) provided herein allow for high loading of sulfur (e.g., even when thin substrate systems are utilized), with very good capacity retention. In certain embodiments, a lithium battery (e.g., lithium-sulfur battery)) comprises an electrode or electrode material provided herein (e.g., as the cathode thereof). In certain embodiments, high sulfur loading is achieved, e.g., about 1 $mg/cm^2$ to about 20 $mg/cm^2$, about 2 $mg/cm^2$ to about 10 $mg/cm^2$, about 3 $mg/cm^2$ to about 8 $mg/cm^2$, about 5 $mg/cm^2$ to about 7 $mg/cm^2$, about 1 $mg/cm^2$ or more, about 3 $mg/cm^2$ or more, or about 5 $mg/cm^2$ or more. In specific instances, such loading achieved using an electrode or electrode material (e.g., substrate thereof) that is about 1 mm in thickness or less, about 0.7 mm in thickness or less, about 0.5 mm in thickness or less, or about 0.2 mm to about 0.4 mm in thickness. In further or alternative embodiments, high capacities are achieved using such materials in a lithium sulfur battery, e.g., about 1 $mAh/cm^2$ to about 20 $mAh/cm^2$, about 2 $mAh/cm^2$ to about 10 $mAh/cm^2$, about 3 $mAh/cm^2$ to about 8 $mAh/cm^2$, about 5 $mAh/cm^2$ to about 7 $mAh/cm^2$, about 1 $mAh/cm^2$ or more, about 3 $mAh/cm^2$ or more, or about 5 $mAh/cm^2$ or more. In specific instances, such loading achieved using an electrode or electrode material (e.g., substrate thereof) that is about 1 mm in thickness or less, about 0.7 mm in thickness or less, about 0.5 mm in thickness or less, or about 0.2 mm to about 0.4 mm in thickness. In certain embodiments, high sulfur loading is achieved, e.g., about 1 $mg/cm^3$ to about 1 $g/cm^3$, about 2 $mg/cm^3$ to about 500 $mg/cm^3$, about 5 $mg/cm^3$ to about 250 $mg/cm^3$, about 10 $mg/cm^3$ to about 100 $mg/cm^3$, about 5 $mg/cm^3$ or more, about 10 $mg/cm^3$ or more, or about 25 $mg/cm^3$ or more. In further or alternative embodiments, high capacities are achieved using such materials in a lithium sulfur battery, e.g., about 1 $mAh/cm^3$ to about 250 $mAh/cm^3$, about 2 $mAh/cm^3$ to about 100 $mAh/cm^3$, about 4 $mAh/cm^3$ to about 80 $mAh/cm^3$, about 5 $mAh/cm^3$ to about 50 $mAh/cm^3$, about 1 $mAh/cm^3$ or more, about 10 $mAh/cm^3$ or more, or about 25 $mAh/cm^3$ or more.

In certain embodiments, provided herein is an electrode or electrode material (or lithium battery comprising the same) having a specific capacity of about 200 mAh/g or more, about 250 mAh/g or more, about 300 mAh/g or more, about 350 mAh/g or more, about 450 mAh/g or more, about 500 mAh/g or more, about 600 mAh/g or more, about 650 mAh/g or more, about 700 mAh/g or more, about 800 mAh/g or more, or about 900 mAh/g or more. In specific embodiments, the capacity is a measured relative to the amount of sulfur present in the electrode. (E.g., wherein sulfur is loaded in at an amount, such as described herein, in $g_{sulfur}/cm^2$ and the capacity is as provided herein in an amount of $mAh/g_{sulfur}$, the product of which thereby provides an area capacity of $mAh/cm^2$.) In some embodiments, the capacity is the initial capacity, the capacity after 5 cycles, after 10 cycles, after 20 cycles, after 50 cycles, after 100 cycles, after 200 cycles, after 300 cycles, or more. In some embodiments, the capacity after 5 cycles, after 10 cycles, after 20 cycles, after 50 cycles, after 100 cycles, after 200 cycles, or after 300 cycles is at least 50%, at least 60%, at least 70%, at least 80%, or at least 85% of the initial capacity. Any capacity described herein includes reference to any or all of the charge capacity, discharge capacity, or specific capacity unless otherwise specified. Unless otherwise specified, capacities described herein include reference to any or all of a charge and/or discharge rate of 0.1 C, 0.2 C, 0.25 C, 0.5 C, 1 C, 2 C, 3 C, about 417 mA/g, or more.

In some embodiments, the electrode is thin and/or flexible, facilitating the use of the electrode in numerous applications, including thin layer battery applications, such as for use in wearable electronics. In certain embodiments, an electrode or electrode material provided herein has a thickness of about 0.02 mm to about 2 mm, e.g., about 0.05 mm to about 1 mm, about 0.1 mm to about 0.5 mm, or about 0.2 mm to about 0.4 mm. In certain embodiments, electrodes provided herein (e.g., in a thin layer lithium sulfur battery comprising such an electrode) can be folded at an angle of at least 90 degrees (e.g., at least once, at least twice, at least 5 times, at least 10 times, at least 20 times, at least 50 times, or the like) and retain at least 50% capacity, at least 60% capacity, at least 70% capacity, at least 80% capacity, at least 90% capacity, at least 95% capacity, or at least 98% capacity.

In some embodiments, any electrode provided herein retains battery function upon and after distortion. For example, in some embodiments, after at least 10 cycles of distorting by at least 90 degrees (e.g., around a 10 mm diameter rod), a cell comprising an electrode described herein has an open circuit voltage (OCV) within 25% of the open circuit voltage of the cell prior to distortion (e.g., 100% to 125% of the OCV prior to distortion). In specific embodiments, after at least 10 cycles of distorting by at least 90 degrees, a cell comprising an electrode described herein has an open circuit voltage within 15% of the open circuit voltage of the battery prior to distortion. In more specific embodiments, after at least 10 cycles of distorting by at least 90 degrees, a cell comprising an electrode described herein has an open circuit voltage within 10% of the open circuit voltage of the cell prior to distortion. In still more specific embodiments, after at least 10 cycles of distorting by at least 90 degrees, a cell comprising an electrode described herein has an open circuit voltage within 5% of the open circuit voltage of the cell prior to distortion. In yet more specific embodiments, after at least 10 cycles of distorting by at least 90 degrees, a cell comprising an electrode described herein has an open circuit voltage within 2% of the open circuit voltage of the cell prior to distortion.

For example, in some embodiments, after at least 10 cycles of distorting by at least 90 degrees (e.g., around a 10 mm diameter rod), an electrode (or carbon substrate thereof) provided herein has a conductivity within 25% of the conductivity of the electrode (or carbon substrate thereof) prior to distortion (e.g., 75% to 100% of the conductivity prior to distortion). In specific embodiments, after at least 10 cycles of distorting by at least 90 degrees, a electrode (or carbon substrate thereof) provided herein has conductivity within 15% of the conductivity prior to distortion. In more specific embodiments, after at least 10 cycles of distorting by at least 90 degrees, a electrode (or carbon substrate thereof) provided herein has a conductivity within 10% of the conductivity of the electrode (or carbon substrate thereof) prior to distortion. In still more specific embodiments, after at least 10 cycles of distorting by at least 90 degrees, a electrode (or carbon substrate thereof) provided herein has a conductivity within 5% of the conductivity of the electrode (or carbon substrate thereof) prior to distortion. In yet more specific embodiments, after at least 10 cycles of distorting by at least 90 degrees, a electrode (or carbon substrate thereof) provided herein has a conductivity within 2% of the conductivity of the electrode (or carbon substrate thereof) prior to distortion.

In some embodiments, a cell (or electrode) provided herein has a discharge capacity of at least 80% of discharge capacity after 10 cycles of distorting by at least 90 degrees (e.g., around a 10 mm diameter rod) (e.g., compared to an otherwise identical cell operated under identical conditions in the absence of said distortion cycles). In some embodiments, a cell (or electrode) provided herein has a discharge capacity of at least 80% of discharge capacity after 30 cycles of distorting by at least 90 degrees (e.g., around a 10 mm diameter rod). In some embodiments, a cell (or electrode) provided herein has a discharge capacity of at least 80% of discharge capacity after 40 cycles of distorting by at least 90 degrees (e.g., around a 10 mm diameter rod). In some embodiments, a cell (or electrode) provided herein has a discharge capacity of at least 80% of discharge capacity after 50 cycles of distorting by at least 90 degrees (e.g., around a 10 mm diameter rod).

In certain embodiments, the substrate and/or layer comprises a three dimensional porous carbon (e.g., a network of carbon nanotubes, carbon paper, a carbon nanofiber mat, or the like), sulfur infused in the porous carbon, and a carbonaceous or conductive additive. In some embodiments, the carbonaceous or conductive additive is a nanostructured material. In certain instances, an additional conductive additive is optionally utilized to facilitate electron conductivity of the substrate and/or electrode as a whole (e.g., to facilitate improved rate capability of the electrode). In specific embodiments, the conductive additive is conductive carbon, such as carbon black (e.g., Super P), carbon nanotubes, graphene nanoribbons, graphene, or any other suitable material. Any suitable amount of carbonaceous or conductive additive is optionally utilized. In specific embodiments, about 0.01 wt. % to about 80 wt. % of carbonaceous and/or conductive additive (relative to the carbon substrate) is optionally utilized. In specific embodiments, about 0.1 wt % to about 50 wt %, about 0.2 wt % to about 40 wt %, about 1 wt % to about 30 wt %, or the like of carbonaceous and/or conductive additive (relative to the carbon substrate) is optionally utilized.

Also provided herein are lithium batteries (e.g., lithium sulfur batteries) comprising an electrode described herein. In some embodiments, the lithium battery comprises a negative electrode, a separator, and a positive electrode, the positive electrode being an electrode described herein. Generally, the separator is positioned between the positive and negative electrodes. Any suitable separator is optionally utilized.

Any suitable electrolyte and/or separator is optionally utilized in a cell or battery provided herein. In certain embodiments, the electrolyte is a liquid electrolyte. In other embodiments, the electrolyte is a solid electrolyte (or otherwise ionic conductive solid).

In some embodiments, the electrolyte comprises a non-aqueous, e.g., an aprotic, solvent. In specific embodiments, the electrolyte comprises a non-aqueous, e.g., aprotic, solvent and a lithium salt (e.g., $LiCF_3SO_4$ and $LiNO_3$). In specific embodiments, the lithium salt is, by way of non-limiting example, LiCl, LiBr, LiI, $LiClO_4$, $LiBF_4$, $LiB_{10}Cl_{10}$, $LiPF_6$, $LiCF_3SO_3$, $LiCF_3CO_2$, $LiAsF_6$, $LiSbF_6$, $LiAlCl_4$, $LiCH_3SO_3$, $LiCF_3SO_3$, a lithium carbonate (lower aliphatic carbonate), or the like, or a combination thereof. Recitation of such a salt in a solvent herein, includes such salt being in solvated, disassociated, partially disassociated, and/or associated forms. In various embodiments, non-aqueous solvents include, by way of non-limiting example, cyclic carbonic acid esters (e.g., ethylene carbonate or propylene carbonate), acyclic carbonic acid esters (e.g., dimethylcarbonate, ethyl methyl carbonate, or diethyl carbonate), cyclic carboxylic acid esters (e.g., γ-butyrolactone), cyclic ethers (e.g., tetrahydrofuran, 2-methyltetrahydrofuran, or dioxolane), acyclic ethers (e.g., dimethoxymethane or dimethoxyethane), and combinations thereof. Suitable aprotic solvents include, by way of non-limiting example, 1,2-dimethoxyethane (DME), dioxolane (DOL), or a combination thereof.

In certain embodiments, the separator comprises a polymeric material, such as a porous polymer matrix. In some embodiments, the separator polymer is a polyolefin (e.g., polypropylene (PP), polyethylene (PE)), polyethylene terephthalate (PET), polyphenylene sulfide (PPS), polyvinylidene fluoride (PVdF), polymethylmethacrylate (PMMA), polyacrylonitrile (PAN), polyvinlacetate (PVAc), or the like. In specific embodiments, the separator comprises a porous polymer (e.g., polyethylene (PE) or polypropylene (PP)) film, such as manufactured by Celgard® (stretched or cast polymer films). In other embodiments, the separator comprises a nanofiber mat. In specific embodiments, the nanofiber mat comprises one or more nanofiber comprising a polymer. In some specific embodiments, the nanofibers comprise a polymer matrix. In more specific embodiments, the nanofiber(s) comprise a polymer matrix with nanoclay or ceramic nanostructures (e.g., nanoparticles) embedded within the polymer matrix (e.g., wherein the nanostructures are not agglomerated). Any suitable clay or ceramic is optionally utilized, e.g., silica, alumina, zirconia, beryllia, ceria, titania, barium titanate, strontium titanate, montmorillonite, fluorohectorite clay, laponite clay, bentonite, beidellite, hectorite, saponite, nontronite, sauconite, vermiculite, ledikite, magadiite, kenyaite, stevensite, or a combination thereof. In other embodiments, the nanofibers comprise a polymer matrix and a ceramic (e.g., silica) matrix. In specific embodiments, suitable polymer/clay and polymer/ceramic nanostructures and methods for manufacturing the same are described in more detail in U.S. Pat. No. 7,083,854, PCT/US13/066056, and U.S. 61/911,814, each of which are incorporated herein for such disclosure.

The separator is of any suitable thickness and porosity. In some embodiments, the thickness is about 5 microns to about 50 microns. In specific embodiments, the thickness is about 8 microns to about 40 microns. In still more specific embodiments, the thickness is about 10 microns to about 35 microns. In some embodiments, the porosity of the separator is about 30% to about 70%, or about 35% to 60% (e.g., as determined by the void space as a percentage of the total apparent volume of the separator material).

In addition, any suitable negative electrode is optionally utilized. In certain embodiments, the negative electrode comprises lithium metal (e.g., a lithium metal foil), and/or lithiated silicon (e.g., lithiated silicon (e.g., micro- (e.g., having a or an average dimension of greater than 500 nm) or nano- (e.g., having a or an average dimension of less than 2 micron)) particles, including low aspect ratio particles (e.g., aspect ratio of about 1 to about 10) and high aspect ratio particles (e.g., aspect ratio of greater than 10, including fibers, rods, pillars, and the like). In certain instances, a negative electrode provided herein comprises lithium metal, silicon, germanium, tin, oxides thereof, or combinations thereof.

In specific embodiments, the negative electrode comprises lithium, such as a lithium sheet (e.g., foil). In more specific embodiments, the negative electrode comprises lithium, such as a lithium sheet (e.g., foil), in combination with a conductive metal (e.g., aluminum or copper), such as a conductive metal sheet (e.g., foil). In certain embodiments, the negative electrode comprises a lithium deposition. In some embodiments, the negative electrode comprises nanostructured lithium.

In further or alternative embodiments, the negative electrode comprises silicon, germanium, or tin, or oxides thereof, such as nanoparticles thereof.

The battery of any one of the preceding claims, wherein the negative electrode comprises a plurality of nanostructures (e.g., nanoparticles), the nanostructures comprising silicon, germanium, tin, an oxide thereof, or a combination thereof. In certain embodiments, the nanostructures comprise a composite of carbon and silicon, germanium, tin, an oxide thereof, or a combination thereof. In certain embodiments, nanostructures comprise nanofibers, or fragments thereof, comprising nanoparticles of silicon, germanium, tin, oxides thereof, or a combination thereof, embedded within carbon. In some embodiments, the negative electrode comprises a silicon-carbon nanocomposite nanofiber, the nanofiber comprising a plurality of (e.g., non-aggregated) silicon nanoparticles embedded in a carbon matrix. In further or alternative embodiments, the negative electrode comprises a silicon-carbon nanocomposite, the nanocomposite comprising a plurality of (e.g., non-aggregated) silicon nanoparticles wrapped with carbon. In some embodiments, specific silicon-carbon nanocomposite materials and processes for manufacturing the same are described in more detail in WO 2013/130712 and PCT/US14/025974, both of which are incorporated herein by reference for such disclosure.

The battery of any one of the preceding claims, wherein the negative electrode further comprises carbon, such as a carbon allotrope. In certain embodiments, the carbon additive is a nanostructured carbon. In specific embodiments, the negative electrode comprises carbon powder, carbon nanotubes, graphene (e.g., graphene sheets, graphene nanoribbons, or a combination thereof), or a combination thereof.

In certain embodiments, provided herein is a battery comprising any one or more of the components described herein, and a battery housing enclosing such components. In some embodiments, the battery comprises a positive electrode described herein. In some embodiments, the battery comprises a sulfur-containing positive electrode (e.g., integrated with a porous carbon substrate that functions alone or in combination (e.g., with conductive additives) as a current collector), a negative electrode (e.g., a lithium metal negative electrode), and a conductive metal (e.g., aluminum or copper) negative electrode current collector. In further embodiments, the battery further comprises a positive electrode current collector (e.g., a conductive metal, such as aluminum or copper).

In specific embodiments, the battery provided herein is a flexible battery. In more specific embodiments, the battery provided herein is a flexible thin film battery. In other specific embodiments, the battery is a flexible thin wire battery. In certain embodiments, a battery provided herein comprises a flexible battery housing. In specific embodiments, the housing encloses the battery components described herein.

Generally, the battery housing comprises an inert material. In specific embodiments, the flexible battery body comprises a thin sheet (film) of an inert, flexible polymer. In some embodiments, the housing comprises a polyolefin, such as high density polyethylene (HDPE), polyethylene (PE) or polypropylene (PP), polyethylene terephthalate (PET), polyamide, polyurethane, vinyl acetate, nylon (e.g., 6,6-nylon), copolymers thereof, or combinations thereof (e.g., multi-layered constructs). In more specific embodiments, the inert, flexible polymer is polydimethylsiloxane (PDMS).

In some embodiments, the flexible battery body has a first dimension (e.g., the longest dimension—length) and a second dimension (e.g., the shortest dimension, such as height/width/thickness), wherein the ratio of the first dimension to the second dimension is at least 10. In more specific embodiments, the ratio is at least 20. In still more specific embodiments, the ratio is at least 50 or at least 100.

Also provided herein are processes of manufacturing electrodes and electrode materials provided herein. In some embodiments, a fluid composition comprising sulfur is deposited onto a substrate (e.g., porous substrate, such as described herein). In specific embodiments, the fluid composition is electrosprayed onto the substrate, or a layer or component thereof.

In specific embodiments, provided herein is a process of manufacturing an electrode or electrode material, the process comprising:
  a. producing an electrostatically charged plume comprising a plurality of nanoscale particles and/or droplets from a fluid stock by:
    i. providing the fluid stock to a first inlet of a first conduit of an electrospray nozzle, the first conduit being enclosed along the length of the conduit by a wall having an interior surface and an exterior surface, the first conduit having a first outlet, and the fluid stock comprising sulfur (e.g., an electrode active sulfur compound, or a precursor thereof) and a solvent; and ii. providing a voltage to the nozzle (e.g., wall of the first conduit), the voltage providing an electric field (e.g., at the first outlet); and b. collecting a sulfur deposition on a substrate (e.g., a porous substrate, such as a porous carbon substrate described herein) (e.g., the sulfur deposition comprising sulfur).

In some embodiments, the fluid stock comprises sulfur and an optional solvent. In specific embodiments, sulfur, as referred to herein, includes reference to an electrode active sulfur material (e.g., functions as a positive electrode material in a lithium battery, such as having a specific capacity of at least 100 mAh/g), or a precursor thereof. In more specific embodiments, the sulfur is or comprises elemental sulfur (e.g., $S_8$), a sulfur allotrope, a sulfide (e.g., a lithium sulfide (e.g., $Li_2S$, $Li_2S_2$, $Li_2S_3$, $Li_2S_4$, $Li_2S_6$, $Li_2S_8$, combinations thereof, and/or disassociated ions thereof)), a polysulfide, or the like. In further or additional embodiments, the polysulfide comprises an organo-polysulfide, such as a polysulfide copolymer. In specific embodiments, the polysulfide is poly(sulfur-random-1,3-diisopropenylbenzene) (poly(S-r-DIB)) and/or a species set forth in WO 2013/023216, which is incorporated herein for such disclosure. In addition, the sulfur of any electrode or electrode material described herein is or comprises any one or more sulfur material as described above. Any suitable solvent is optionally utilized in the fluid stock, such as carbon disulfide ($CS_2$), alcohol, acetone, chlorobenzene, benzene, toluene, xylene, chloroform, aniline, cyclohexane, dimethyl furan (DMF), or the like.

In some embodiments, the substrate is a porous substrate, such as a carbon substrate. In specific embodiments, the substrate is a substrate as described herein (e.g., in describing the electrodes herein), and/or a layer thereof (e.g., the first layer of the substrate described for the electrodes herein). In specific embodiments, the substrate is a substrate comprising a first layer or domain and a second layer or domain, the first layer or domain (i) having a greater porosity and/or average pore size; and/or (ii) a being less dense than the second layer or domain. In more specific embodiments, the fluid stock is electrosprayed onto the first layer or domain (e.g., the less dense and/or more porous layer or domain of the substrate). In some instances, such deposition facilitate loading of the sulfur into the carbon substrate, without having to penetrate the more dense surface thereof (e.g., the surface, layer, and/or domain designed, in some instances, to facilitate blocking the migration of active sulfur therethrough).

In some embodiments, following collection of the sulfur deposition on the substrate (e.g. porous carbon substrate), the sulfur of the sulfur deposition is allowed to infuse into the porous carbon substrate. In specific embodiments, e.g., wherein the substrate used in the process is characteristic of the first layer of the electrode or electrode material substrate described above, a second substrate layer is optional positioned in proximity to the substrate infused with sulfur (e.g., thereby preparing a multi-layered electrode or electrode material as described herein).

In certain specific embodiments, e.g., wherein the substrate used in the process is characteristic of the first layer or domain of the electrode or electrode material substrate described above, the process further comprises electrospraying (e.g., using similar or identical conditions as described for electrospraying the fluid stock comprising sulfur) a second fluid stock (e.g., comprising an additive, such as a nanoscaled and/or conducting additive) onto the substrate. In some embodiments, electrospraying the additive on the substrate facilitates reducing the porosity (or average pore size) and/or increasing the density of the substrate on a surface thereof, thus retarding sulfur leeching through that surface. In certain embodiments, the first and second fluid stock is optionally electrosprayed onto the substrate in any order. For example, in some embodiments, the second fluid stock is optionally electrosprayed onto the porous substrate first, creating a multi-layered or multi-domained substrate. In some instances, following deposition of the additive onto the substrate, the sulfur-containing fluid stock is electrosprayed onto the opposite side of the substrate (i.e., the first layer or domain thereof). In certain instances, such process allows for the preparation of a substrate that retards sulfur leeching through through the surface or domain comprising additive and allows infusion of sulfur into the porous substrate via the opposite surface or domain. In alternative embodiments, the substrate is optionally infused with sulfur first and the additive is optionally deposited onto the sulfur infused substrate, the addition of the additive onto the surface of the substrate thereby creating a second domain of the substrate, as described herein. In still further embodiments, the fluid stock comprises both sulfur and additive, e.g., thereby allowing infusion and formation of the second layer or domain during the same electrospray process. In certain instances, a two-step process is preferred because deposition of additive concurrently with the sulfur on the same surface of the substrate may retard the rate of and/or reduce the amount of sulfur capable of being infused into the substrate.

FIG. 1 illustrates a process of providing a fluid stock 101 comprising additive (e.g., sulfur and/or conductive additive, such as conductive carbon, e.g., carbon black (super P), rGO, CNT, GNR, or the like) to an electrospray nozzle system 100 comprising an inner conduit 105 and an outer conduit 106. In some instances, a fluid stock 101 is provided 104 to an inner conduit 105 of the electrospray nozzle 100 and a high pressure gas (e.g., air) is provided to an outer conduit 106. In certain instances, as a voltage is applied to the nozzle, the fluid stock is ejected from the nozzle in the form of a jet or plume 108. In some instances, the pressurized gas is ejected from the nozzle as a high speed gas 107, which facilitates further droplet/particle deformation and reduction in size to form a fine dispersion 110 (e.g., being uniformly dispersed and/or having small uniform particle/droplet size). In certain instances, the droplets/particles are collected on a substrate 111 to form a deposition 112 (e.g., having good uniformity of thickness and/or concentration). The substrate is any suitable substrate, such as a porous substrate (e.g., porous carbon paper membrane 102). In some instances, following deposition, sulfur infuses into the porous substrate 111, such as illustrated by electron dispersive X-ray (EDX) mapping 103. In certain instances, such approaches allow for the formation of an electrode without the need for a binder (e.g., a binder free electrode). Further, good sulfur loading (e.g., up to 10 to 30 mg/cm$^2$) is achieved in various embodiments.

Figure 18:
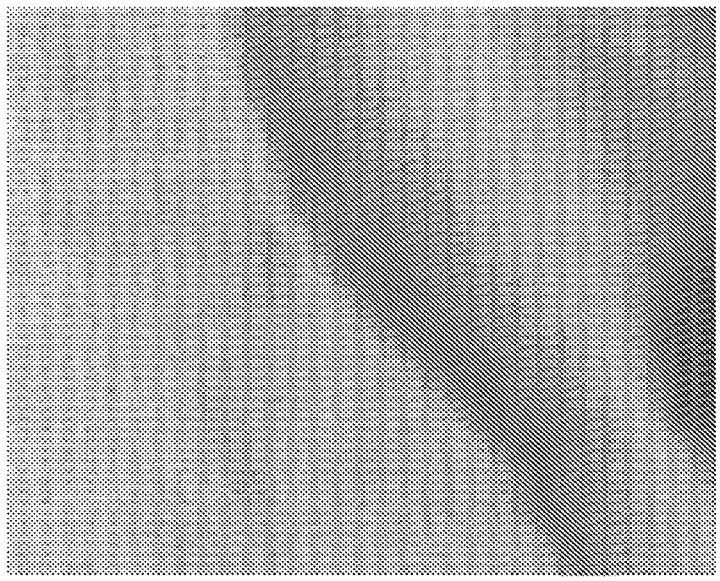
FIG. 18 illustrates images of a deposition formed (panel A) after 1 minute of gas controlled electrospraying of a graphene oxide stock, and (panel B) after 1 minute of electrospraying of the graphene stock without air.
Figure 18:
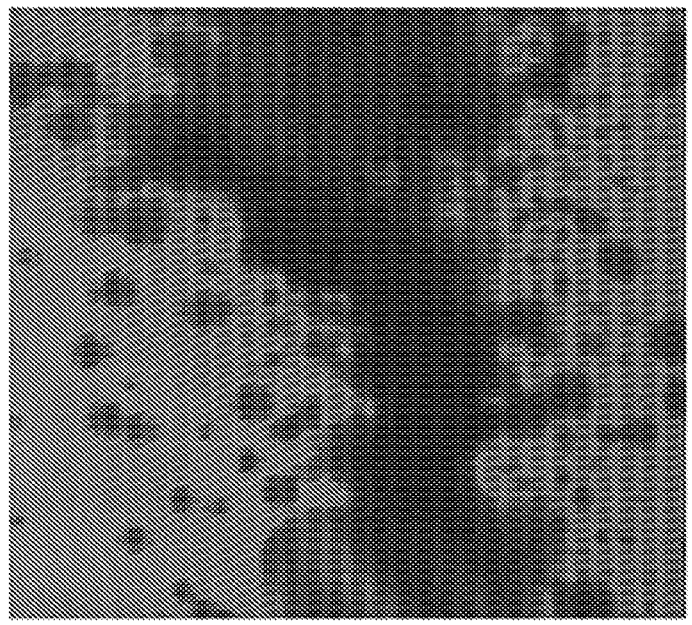

In some instances, good uniformity of deposition of the additive provided improved capacity and capacity retention for electrodes provided herein. In certain instances, good and uniform coverage of the surface of a substrate allows similar electrochemical activity over the entirety of the electrode (e.g., allows similar insertion and egress of lithium ions during cell cycling over the surface of the electrode), while, importantly, minimizing the loss of sulfur (e.g., in the form of electrochemically soluble polysulfides) during cycling. As illustrated in FIG. 18, gas controlled electrospray processes provided herein are excellent for providing uniform deposition of carbonaceous additives (e.g., graphene oxide), whereas non-gas-assisted processes fail to provide good and uniform coatings.

Figure 2:
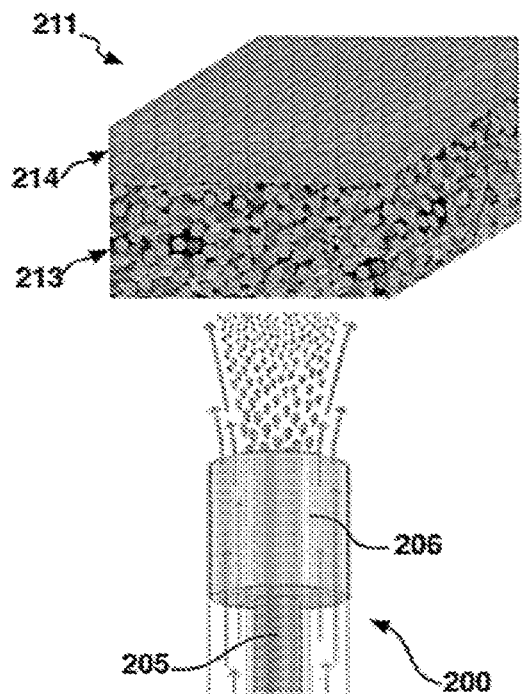
FIG. 2 illustrates a process for manufacturing an electrode according to the processes described herein.

FIG. 2 illustrates a process of providing a fluid stock comprising additive (e.g., sulfur) to an electrospray nozzle system 200 comprising an inner conduit 205 and an outer conduit 206. In some instances, a fluid stock is provided to an inner conduit 205 of the electrospray nozzle 200 and a high pressure gas (e.g., air) is provided to an outer conduit 206. In certain instances, the substrate 211 is a multi-layered substrate comprising a coarse porous layer 213 (e.g., to facilitate high sulfur loading) and a dense porous layer 214 (e.g., to facilitate capacity retention). As illustrated, in some instances, the sulfur is electrosprayed/deposited onto the coarse porous layer 213, e.g., to facilitate infusion of the sulfur into the substrate. In certain instances, electrospraying of the sulfur onto the dense porous layer would not be preferred as the dense layer would retard or prevent infusion of the sulfur into the porous substrate (e.g., as it would retard or prevent sulfur leeching out of the electrode during cell operation).

In some embodiments, the substrate is a multi-layered or multi-domained substrate having a first and second layer or domain (e.g., an asymmetric porous carbon substrate), such as described for electrode substrates described herein. In certain embodiments, the fluid stock is electrosprayed onto the first layer or domain (e.g., with the second layer facing in the direction opposite the electrospray nozzle). In some embodiments, a sulfur deposition is deposited on the first layer or domain and allowed to infuse into the porous substrate (e.g., first layer thereof).

In certain embodiments, an electrode or electrode material described herein is manufactured into a lithium battery cell (e.g., lithium sulfur battery cell). In some embodiments, an electrode described herein is provided into a housing, the first layer or domain of the substrate of the electrode in proximity (e.g., configured adjacent) to and/or facing the housing and/or away from the separator, and the second layer or domain of the substrate of the electrode in proximity (e.g., configured adjacent) to and/or facing the separator and/or away from the housing. As discussed herein, in some embodiments, the second layer is less porous, has a smaller average pore diameter, and/or is more dense than the second layer, such characteristics, in some instances, retarding or eliminating sulfur migration out of the electrode while retaining good lithium mobility through the second layer and out of the electrode (e.g., during cell cycling).

In some embodiments, a process of manufacturing a lithium battery described herein comprises providing an electrode described herein (e.g., as a negative electrode of the cell), positioning a separator (e.g., comprising a first and second surface thereof) adjacent (or facing) the second layer or domain of the electrode substrate (e.g., adjacent (or facing) the first surface of the separator), and positioning a positive electrode (e.g., comprising lithium metal or lithiated sulfur) adjacent (or facing) the separator (e.g., the second surface thereof). In some embodiments, a current collector (e.g., a conducting material, such as a metal sheet (e.g., foil), a conductive carbon substrate, or the like) is optionally positioned adjacent (or facing) the first layer of the negative electrode substrate and/or adjacent (or facing) the positive electrode (e.g., adjacent a second surface of the positive electrode, the second surface being opposite a first surface, the first surface of the positive electrode being positioned adjacent (or facing) the separator—i.e., the second surface of the separator).

Also provided in certain embodiments herein are components for manufacturing the electrodes herein, precursors thereof, and the like. For example, in some embodiments, provided herein are fluid stocks described herein. The concentration of additives (e.g., active materials, such as sulfur and/or conductive additives) in fluid stocks ranges from about 1 wt. % to about 50 wt. %, e.g., 1 wt. % to about 25 wt. %. In further embodiments, provided herein are partially treated substrates, such as described herein. For example, in some embodiments, provided herein is a substrate coated on at least one surface of the substrate with an additive (e.g., nanostructured and/or conductive additive, such as a carbon additive). In other exemplary embodiments, provided herein is a substrate (e.g., multilayered and/or multi-domained substrate), such as described herein, comprising a sulfur deposition on at least one surface thereof. In specific embodiments, the sulfur deposition comprises sulfur, such as any sulfur allotrope or compound described herein. In more specific embodiments, the deposition comprises solvent, such as carbon sulfide ($CS_2$). In some embodiments, a substrate provided herein comprises sulfur (e.g., and solvent) at least partially infused into the substrate.

In certain embodiments, sulfur and/or additive is optionally deposited onto a surface of the substrate using any suitable process. In specific embodiments, the process is a spray process, such as air spraying or electrospraying. In preferred embodiments, the processes is an electrospray processes controlled and/or assisted by a gas stream. In specific embodiments, the electrospray process comprises injecting a charged jet or plume of a fluid stock provided herein into a gas stream. In specific instances, the gas stream serves to facilitate disruption of the jet and/or plume (e.g., facilitating breaking the jet or droplets/particles of the plume into smaller droplet/particles), facilitate greater uniformity of dispersion of the droplets/particles of the plume, and/or facilitate uniform deposition (e.g., of droplets and/or particles of the plume) onto a surface (e.g., of a substrate described herein).

In some embodiments, a substrate provided herein comprises sulfur and/or additive, wherein the standard deviation of the concentration of the sulfur and/or additive on the surface is less than 100% (e.g., less than 70%, less than 50%, less than 40%, less than 30%, less than 20%, less than 10%, or the like) of the average concentration (e.g., of a standard measurement, such as a square centimeter). In some instances, uniformity of deposition of sulfur onto the surface facilitates uniform loading of the sulfur into the electrode, which results, in some instances, in improved quality control from batch to batch, improved performance of the overall cell, and other benefits. In certain instances, uniformity of deposition of additive onto the surface facilitates uniform porosity, pore size, and/or density of a surface, or layer or domain of a substrate, thereby reducing areas of too much or not enough coverage, which may result in poor cell performance (e.g., because of poor lithium mobility through the domain or layer in domains where too much additive is present and/or poor retention of sulfur when the porosity of the layer or domain is too great to retard the passage of sulfur therethrough).

As discussed above, in some preferred embodiments, electrospray processes facilitated by a gas flow. In specific embodiments, the process comprises providing a pressurized gas (e.g., air, nitrogen, or the like) to a second inlet of a second conduit of an electrospray nozzle provided herein (e.g., comprising a first inlet to which the fluid stock is provided). In specific embodiments, the second conduit surrounds (at least partially, or completely) the first conduit and/or the first conduit is positioned inside the second conduit. In some instances, providing the high pressure gas to the second inlet thereby provides high velocity gas at a second outlet of the second conduit. Any suitable velocity of gas is suitable, such as about 1 m/s or more, about 10 m/s or more, about 25 m/s or more, about 50 m/s or more, about 100 m/s or more, about 200 m/s or more, about 300 m/s or more, or the like. Any suitable pressure of gas is suitable, such as suitable to achieve a velocity described herein, such as at least 20 pounds per square inch (psi), at least 30 psi, at least 40 psi, at least 50 psi, at least 100 psi, at least 200 psi, or the like. In certain embodiments, the gas is any suitable gas, such as comprising air, oxygen, nitrogen, argon, hydrogen, or a combination thereof. In specific embodiments, the second conduit is enclosed along the length of the conduit by a second wall having an interior surface and the second conduit has a second inlet and a second outlet (as discussed herein). In some embodiments, the second conduit has a second diameter. In certain embodiments, the exterior surface of the first wall and the interior surface of the second wall being separated by a conduit gap, the ratio of the conduit overlap length to the first diameter being about 1 to 100, preferably about 10.

In various embodiments, a fluid stock provided herein comprises sulfur and/or additive in any suitable concentrate. The concentration of additive (e.g., active material additive, such as sulfur and/or conductive additive) is about 1 wt. % to about 50 wt. %, e.g., about 10 wt. % to about 25 wt. %. In some embodiments, the additive present in the fluid stock comprises both sulfur and a (e.g., conductive) additive (e.g., nanostructured carbon). In specific embodiments, the fluid stock comprises sulfur and a (e.g., conductive) additive in a sulfur to (e.g., conductive) additive (e.g., nanostructured carbon) in a ratio of about 1:1 to about 999:1, e.g., about 1:1 to about 99:1, about 7:3 to about 99:1, or about 8:2 to about 98:2. In specific embodiments, the fluid stock comprises sulfur and additive (e.g., a conductive and/or nanostructured additive described herein) are provided in the fluid stock in a weight ratio of the to the carbon inclusion in the fluid stock is about 1:1000 to about 1000:1, preferably about 1:1 to about 10:1, e.g., about 2:1.

In certain embodiments, a fluid stock provided herein comprises a (i) liquid medium and (ii) additive (e.g., sulfur and/or a conductive additive). Additive is optionally present in the fluid stock in any suitable concentration, such as up to about 80 wt. %, e.g., about 70 wt. %. In specific embodiments, additive is present in the fluid stock in a concentration of about 5 wt. % to about 50 wt. %.

In further or alternative embodiments, a fluid stock (and/or depositions provided herein, such as those formed by electrospraying such fluid stocks) comprises an additive that is or comprises a plurality of solid inclusions, such as nano-structures (e.g., nanoparticles, nanorods, nanofibers, and other nano-structured components, such as graphene nanoribbons, carbon nanotubes, and the like). In specific embodiments, the inclusions (e.g., solid nano-structures) comprise a plurality of metal nanoparticles, metal oxide nanoparticles, carbon nanostructures, or any combination thereof. In further or additional embodiments, the solid inclusions comprise carbon inclusions (e.g., nanostructured carbon inclusions, or carbon nanostructures). In specific embodiments, carbon inclusions include, by way of non-limiting example, graphene, graphene oxide, reduced graphene oxide, carbon nanotubes, graphene nanoribbons, carbon nanofibers, mesoporous carbon nanostructures, and/or any combination thereof. In general, carbon or carbonaceous components (e.g., in an additive or substrate herein) described herein comprise at least 60 wt. % (on an elemental basis) carbon, such as about 60 wt. % to about 100 wt. % carbon, about 70 wt. % or more, about 80 wt. % or more, about 90 wt. % or more, about 95 wt. % or more, or the like. In various embodiments, the remainder of the elemental mass includes any suitable element(s), such as hydrogen, oxygen, nitrogen, halide, sulfur, or the like, or combinations thereof.

Figure 16:
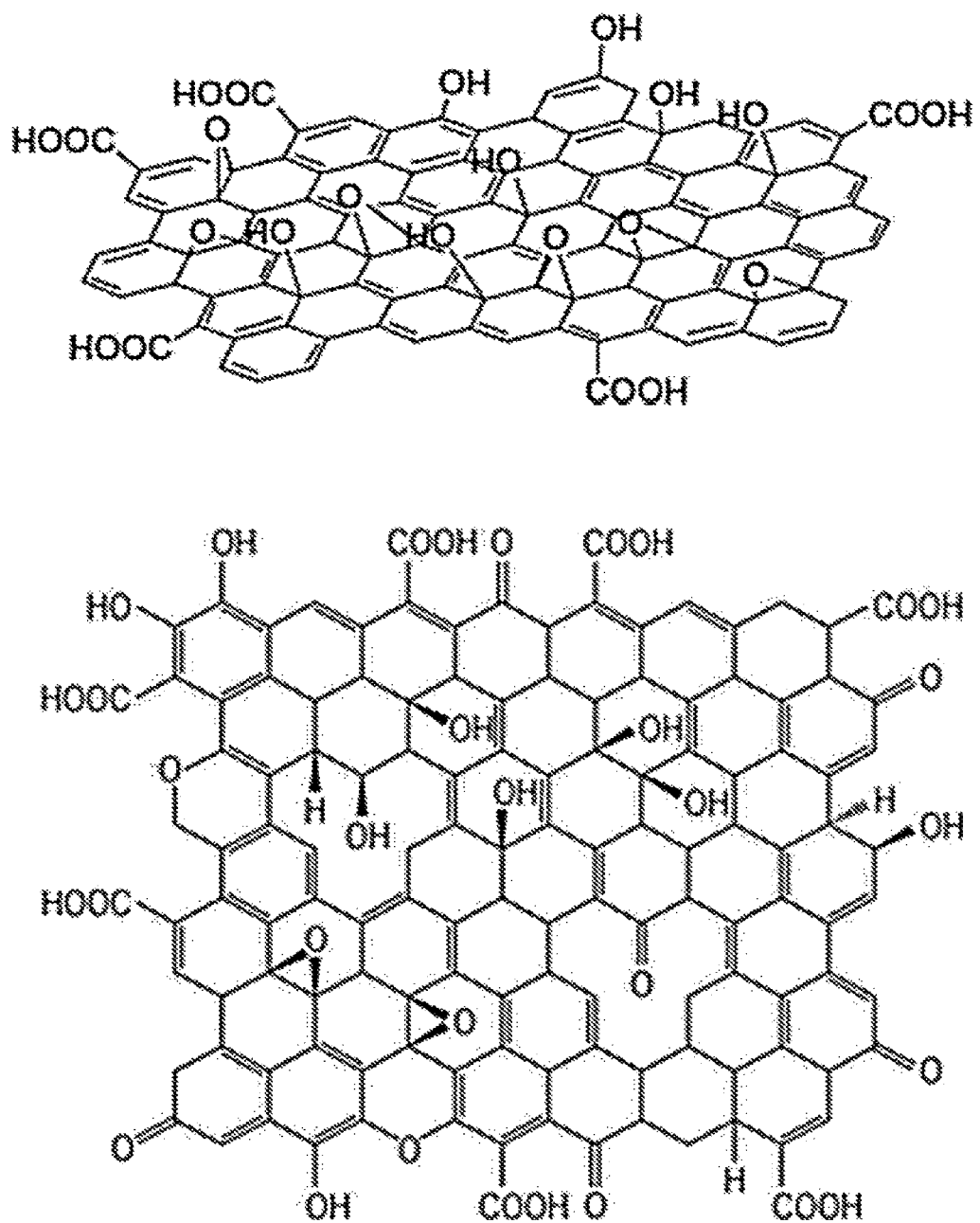
FIG. 16 illustrates exemplary graphene oxide (GO) structures.
Figure 17:
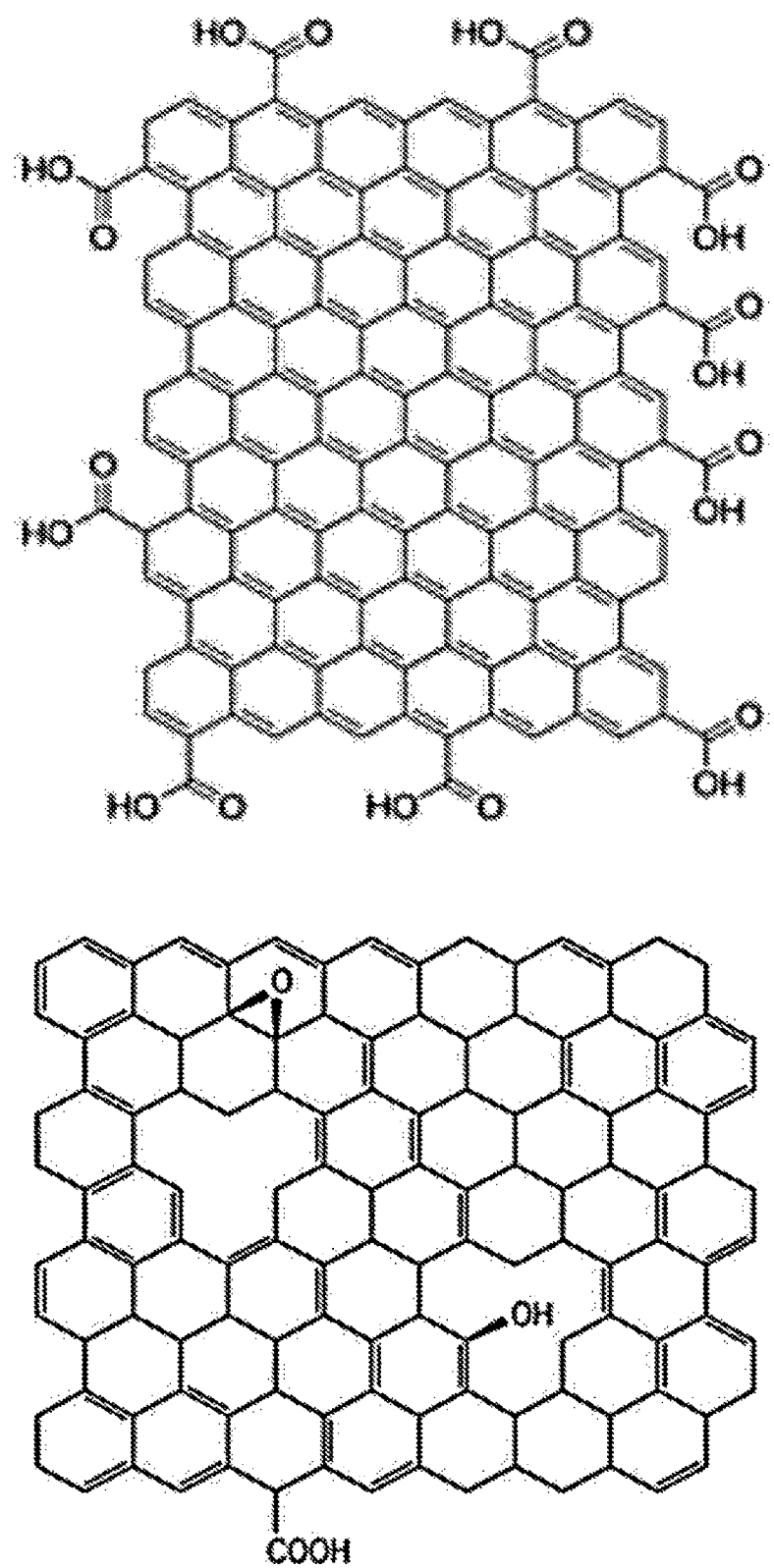
FIG. 17 illustrates exemplary reduced graphene oxide (rGO) structures.

In specific embodiments, the carbon inclusion material is a graphene component, e.g., graphene or an analog there, such as graphene that has one or more carbon atom thereof substituted with one or more additional atom, such as oxygen, halide, hydrogen, sulfur or sulfur containing radicals (e.g., thiols, alkylthio groups, etc.), nitrogen or nitrogen containing radicals (e.g., amine, nitro, etc.), and/or the like. Generally, graphene or graphenic components herein have a general two-dimensional structure (e.g., with 1-25 layers), with a honey-comb lattice structure (which in some instances, such as in non-pristine graphene, graphene oxide, reduced graphene oxide, or the like, may comprise certain defects therein, such as described and illustrated herein). In specific embodiments, the graphene component is an oxidized graphene component. In some instances, the carbon material is or comprises a graphene component, such as graphene, graphene oxide, reduced graphene oxide, or a combination thereof. In specific embodiments, the oxidized graphene component is a graphene component functionalized with oxygen, such as with carbonyl (C=O) groups, carboxyl groups (e.g., carboxylic acid groups, carboxylate groups, COOR groups, such as wherein R is a C1-C6 alkyl, or the like), —OH groups, epoxide groups, ether (—O—) groups, and/or the like. FIG. 16 illustrates an exemplary oxidized graphene component (graphene oxide) structure including COOH, OH, epoxide, ether, and carbonyl groups. Other graphene oxide structures are also contemplated herein. In certain embodiments, the oxidized graphene component (or graphene oxide) comprises about 60% or more carbon (e.g., 60% to 99%). In more specific embodiments, the oxidized graphene component comprises about 60 wt. % to about 90 wt. % carbon, or about 60 wt. % to about 80 wt. % carbon. In further or alternative specific embodiments, the oxidized graphene component comprises about 40 wt. % oxygen or less, such as about 10 wt. % oxygen to about 40 wt. % oxygen, about 35 wt. % oxygen or less, about 1 wt. % to 35 wt. % oxygen, or the like. In some preferred embodiments, the oxidized graphene component comprises sufficient oxygen so as to facilitate dispersion and opening of the graphene sheets in an aqueous medium. In some embodiments, the total percentage of carbon and oxygen does not constitute 100% of the graphene component or analog, with the additional mass comprising any suitable atoms, such as hydrogen (and/or, e.g., nitrogen (e.g., in the form of amine, alkyl amine, and/or the like)). In addition, graphene components utilized in the processes and materials utilized herein optionally comprise pristine graphene sheets, or defective graphene sheets, such as wherein one or more internal and/or external rings are oxidized and/or opened, etc. FIG. 17 illustrates various exemplary reduced graphene oxide (rGO) structures. As illustrated, the structure may have a basic two dimensional honeycomb lattice structure of graphene, with (or without) defects and with (or without) other atoms present (e.g., hydrogen and/or oxygen, including, e.g., oxidized structures, such as discussed and illustrated herein). In various embodiments, the reduced graphene component or reduced graphene oxide comprises about 60% or more carbon (e.g., 60% to 99%), such as about 70 wt. % or greater, about 75 wt. % or more, about 80 wt. % or greater, about 85 wt. % or greater, about 90 wt. % or greater, or about 95 wt. % or greater (e.g., up to about 99 wt. % or more). In certain embodiments, the reduced graphene component (e.g., rGO) comprises about 35 wt. % or less (e.g., 0.1 wt. % to 35 wt. %) oxygen, e.g., about 25 wt. % or less (e.g., 0.1 wt. % to 25 wt. %) oxygen, or about, about 20 wt. % or less, about 15 wt. % or less, about 10 wt. % or less (e.g., down to about 0.01 wt. %, down to about 0.1 wt. %, down to about 1 wt. % or the like) oxygen. In specific embodiments, the reduced graphene component (e.g., rGO) comprises about 0.1 wt. % to about 10 wt. % oxygen, e.g., about 4 wt. % to about 9 wt. %, about 5 wt, % to about 8 wt, %, or the like. In some embodiments, the total percentage of carbon and oxygen does not constitute 100% of the reduced graphene component, with the additional mass comprising any suitable atoms, such as hydrogen, or other atoms or components as discussed herein.

In certain embodiments, any suitable nozzle system configuration is acceptable. In specific embodiments, the first (inner conduit) diameter is about 0.1 mm or more (e.g., about 0.1 mm to about 10 mm for smaller nozzle configurations, such as using direct voltage ($V_{DC}$)), about 0.5 mm or more, about 1 mm or more, about 5 mm or more, about 7.5 mm or more, about 10 mm or more, (e.g., up to about 2.5 cm, up to about 3 cm, up to about 5 cm, or the like) (such as when using larger configurations, e.g., when using alternating voltage ($V_{AC}$)). In further or alternative embodiments, the second (outer conduit) diameter is any suitable diameter that is larger than the first diameter (e.g., about 1.1 times or more the first diameter, about 1.5 times or more the first diameter, about 1.1 times to about 3 times, or about 1.1 times to about 2 times the first diameter). In specific embodiments, the second diameter is about 5 mm to about 10 cm (e.g., about 10 mm to about 8 cm, or about 0.2 mm to about 15 mm, such as for smaller nozzle configurations).

In certain embodiments, the conduit gap (the average distance between the exterior surface of the inner conduit wall and the interior surface of the outer conduit wall) is any suitable distance, such as a distance configured to allow suitable airflow quantity and/or velocity to the nozzle tip and beyond to break up and/or otherwise facilitate reducing the size of the droplets produced by the spraying process and/or system. In specific embodiments, the conduit gap is about 0.1 mm or more, about 0.5 mm or more, about 1 mm or more, about 5 mm or more, about 10 mm or more, or the like (e.g, up to about 20 mm or up to about 30 mm).

In certain embodiments, the spraying process and/or system provided herein comprises applying and/or is configured to provide a voltage to the nozzle, the voltage being about 8 kV, e.g., about 8 $kV_{DC}$ to about 30 $kV_{DC}$, about 10 $kV_{DC}$ to about 25 $kV_{DC}$, about 18 $kV_{AC}$ to about 25 $kV_{AC}$, or about 30 $kV_{AC}$ or more (e.g., with higher voltages used, in some instances, with larger nozzle systems). In certain embodiments, a power supply is configured to provide a voltage (e.g., a direct voltage ($V_{DC}$) or an alternating voltage ($V_{AC}$) to the nozzle. In some instances, higher voltage are optionally utilized when a voltage is applied to nozzle system comprising a number of nozzles. In some embodiments, if appropriate, a voltage is optionally not applied to a system and/or process provided herein. In some embodiments, the power supply system comprises any suitable components to provide the desired voltage, power, frequency, wave shape, etc. to the nozzle. In specific embodiments, the power supply comprises, by way of non-limiting example, a generator, an amplifier, a transformer, or a combination thereof. In certain embodiments, the voltage ($V_{AC}$) is applied at any frequency, e.g., 50 Hz or more, about 50 Hz to about 500 Hz, about 60 Hz to about 400 Hz, about 60 Hz to about 120 Hz, about 250 Hz, or the like.

In certain embodiments, processes and/or systems provided herein are configured to facilitate very high flow and throughput rates (e.g., relative to other spray systems, such as direct current systems, including, in some instances, e.g., gas-controlled, direct current electrospray systems). In specific embodiments, the flow rate of the fluid stock (e.g., provided to the first inlet of the nozzle) is about 0.1 mL/min or more (e.g., about 0.1 mL/min to about 20 mL/min, about 0.3 mL/min or more, about 0.5 mL/min or more, about 1 mL/min or more, about 2.5 mL/min or more, about 5 mL/min or more, or the like). In certain embodiments, processes and/or systems provided herein allow the processing of highly viscous fluids (e.g., relative to other spray systems). For example, in some embodiments, the viscosity of a fluid stock provided herein is about 1 cP or more, about 5 cP or more, about 10 cP or more, about 20 cP or more, and/or up to 10 Poise or more.

In certain embodiments, provided herein is a process for producing a deposition (e.g., a thin layer deposition), the process comprising coaxially electrospraying a fluid stock with a voltage and a gas, thereby forming a jet and/or a plume, the gas at least partially surrounding the jet and/or the plume (e.g., the plume comprising a plurality of droplets, such as nanoscale droplets described herein). In some instances, the fluid stock, the jet, and/or the plume comprise a liquid medium (e.g., solvent) and an additive (e.g., sulfur and/or a conducting additive).

In certain embodiments, processes and systems described herein allow for good control of the thickness of depositions (e.g., additive loading on (e.g., the surface of) a substrate described herein) provided for and described herein. In some embodiments, a deposition provided herein is a thin layer deposition, e.g., having an average thickness of 1 mm or less, e.g., about 1 micron to about 1 mm. In specific embodiments, the deposition has a thickness of about 500 micron or less, e.g., about 1 micron to about 500 micron, about 1 micron to about 250 micron, or about 10 micron to about 200 micron. Further, the processes and systems described herein not only allow for the manufacture of thin layer depositions, but of highly uniform thin layer depositions. In some embodiments, the depositions provided herein have an average thickness, wherein the thickness variation is less than 50% of the average thickness, e.g., less than 30% of the average thickness, or less than 20% of the average thickness. In addition, in some embodiments wherein nano-inclusions (additives) are included in the fluid stock and/or deposition (e.g., wherein the deposition comprises a matrix material, such as a polymer matrix material), the dispersion of the nano-inclusions (additives) is such that the most probable distance between the nano-inclusions is from about 100 nm to about 1000 nm.

In certain embodiments, provided herein are materials, compositions, electrodes and processes for preparing such materials, compositions and electrodes with uniform sulfur and/or additive loading therein and/or thereon. In certain embodiments, the variation of loading of sulfur and/or additive in and/or on a substrate herein is less than 50% based on weight, such as less than 30%, less than 20%, or the like. In various embodiments, the sulfur loading of (in and/or on) a substrate herein is about 3 $mg/cm^2$ or more, about 4 $mg/cm^2$ or more, about 5 $mg/cm^2$ or more, or more, such as described herein. In certain embodiments, the additive (e.g., graphenic component, such as an oxidized graphenic component (e.g., graphene oxide or reduced graphene oxide)) loading on the surface of a substrate herein is at least 0.01 mg/cm$^2$, such as about 0.05 mg/cm$^2$ to about 2 mg/cm$^2$, such as about 0.1 mg/cm$^2$ to about 1 mg/cm$^2$. In some instances, further loading of additive (e.g., carbon black) is also utilized, such as in and/or on the surface of the substrate in any suitable amount.

Further, in some embodiments, it is desirable that any additives in the fluid stock are dissolved and/or well dispersed prior to electrospray, e.g., in order to minimize clogging of the electrospray nozzle, ensure good uniformity of dispersion of any inclusions in the resulting deposition, and/or the like. In specific embodiments, the fluid stock is agitated prior to being provided to the nozzle (e.g., inner conduit inlet thereof), or the system is configured to agitate a fluid stock prior to being provided to the nozzle (e.g., by providing a mechanical stirrer or sonication system associated with a fluid stock reservoir, e.g., which is fluidly connected to the inlet of the inner conduit of an electrospray nozzle provided herein).

Further iterations and details for electrospray processes, as well as deposition characteristics, optionally utilized in certain embodiments herein are set forth in U.S. Provisional Patent Application Nos. 62/254,392, entitled "Air Controlled Electrospray Manufacturing and Products thereof," and 62/254,405, entitled "Alternating Current Electrospray Manufacturing and Products thereof," both filed Nov. 12, 2015, and both of which are incorporated herein by reference for such disclosure.

EXAMPLES

Example 1

A fluid stock comprising sulfur and carbon inclusions in carbon sulfide (CS$_2$) is prepared. The fluid stock is homogenized using stirring and sonication. The fluid stock is electrosprayed by injecting the fluid stock into a gas (air) stream using an inner conduit/outer conduit configuration described herein. A voltage of about 10 kV to about 15 kV is maintained at the nozzle. A deposition is collected on a porous carbon substrate (e.g., having a coarse porous layer and a dense porous layer), positioned about 20 cm to about 25 cm from the nozzle (e.g., with the coarse porous layer configured in the direction of the nozzle). The fluid stock is electrosprayed until about 6 mg/cm$^2$ is loaded onto the substrate.

Figure 3:
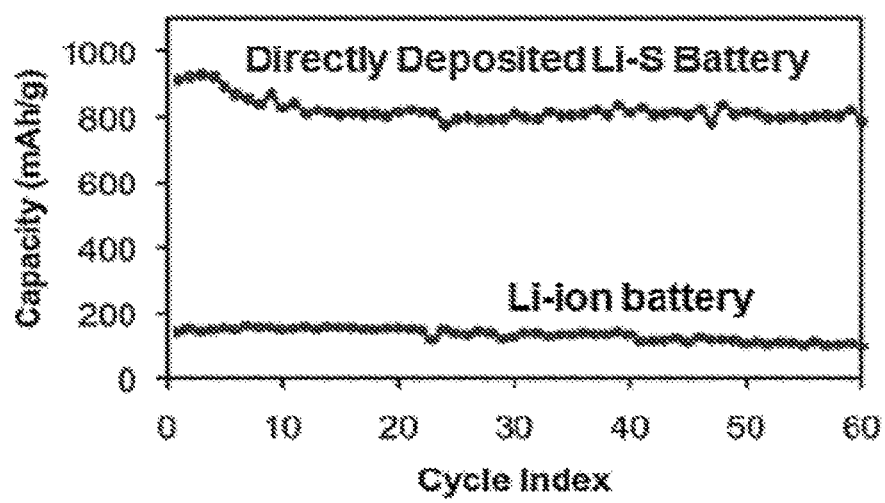
FIG. 3 illustrates a comparison of the capacity of an exemplary lithium sulfur positive electrode provided herein compared to the capacity of a standard lithium ion battery positive electrode.

Using processes such as described, electrodes are prepared and manufactured into lithium sulfur battery cells (e.g., using a stretched polyolefin separator (Celgard), and a lithium foil counter electrode (anode) (e.g., with a metal foil current collector)). Coin and/or flexible thin layer pouch cells are prepared. In such a cell, an electrode prepared according to or similar to as described above demonstrates a high capacity (>5 mAh/cm$^2$), good flexibility, and good capacity retention (without current collector). FIG. 3 illustrates the half-cell capacity of the electrode over several cycles. As is illustrated, capacities of about 800 mAh/g are achieved and maintained for at least 60 cycles.

Example 2

Figure 4:
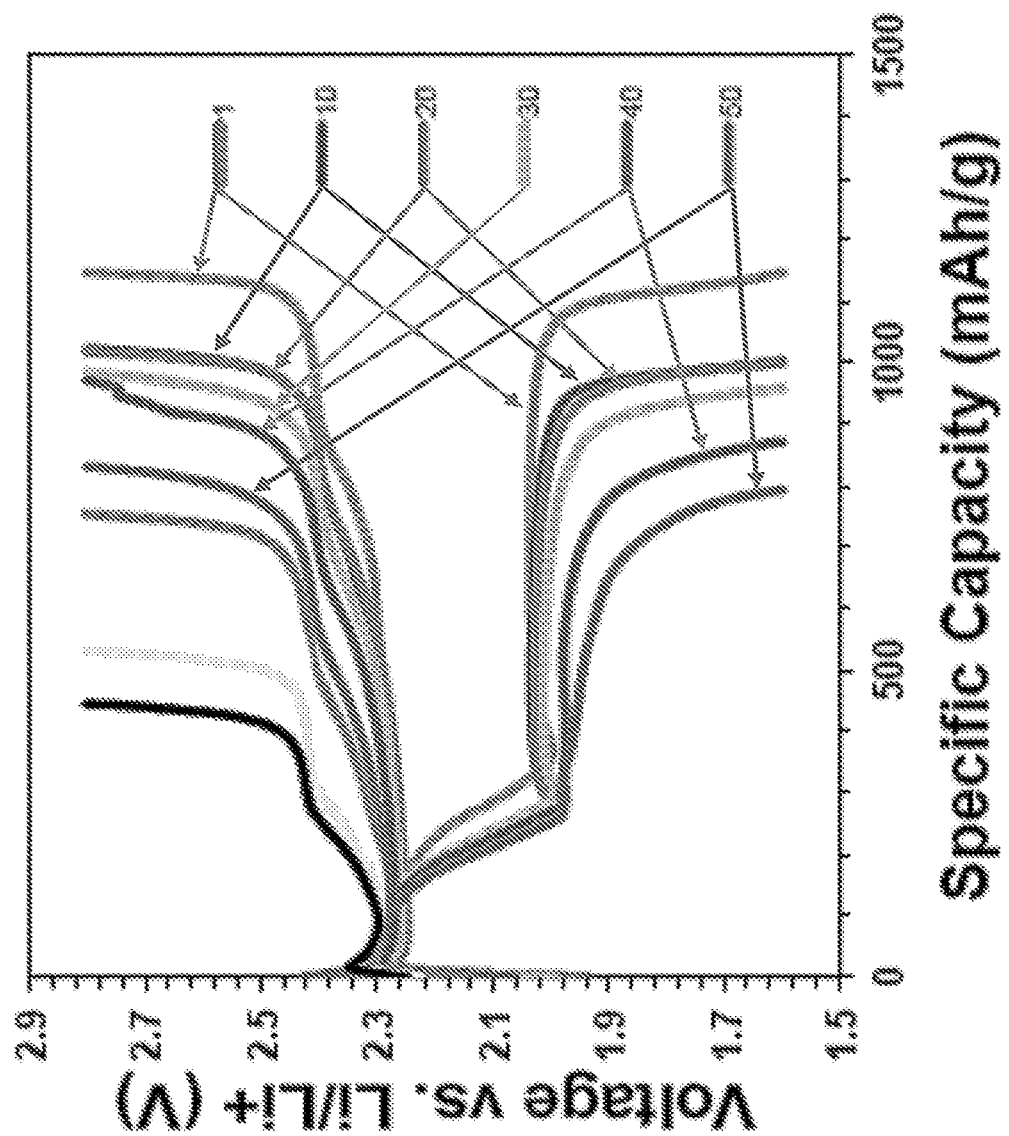
FIG. 4 illustrates charge/discharge curves at various cycles for an exemplary positive electrode provided herein.
Figure 5:
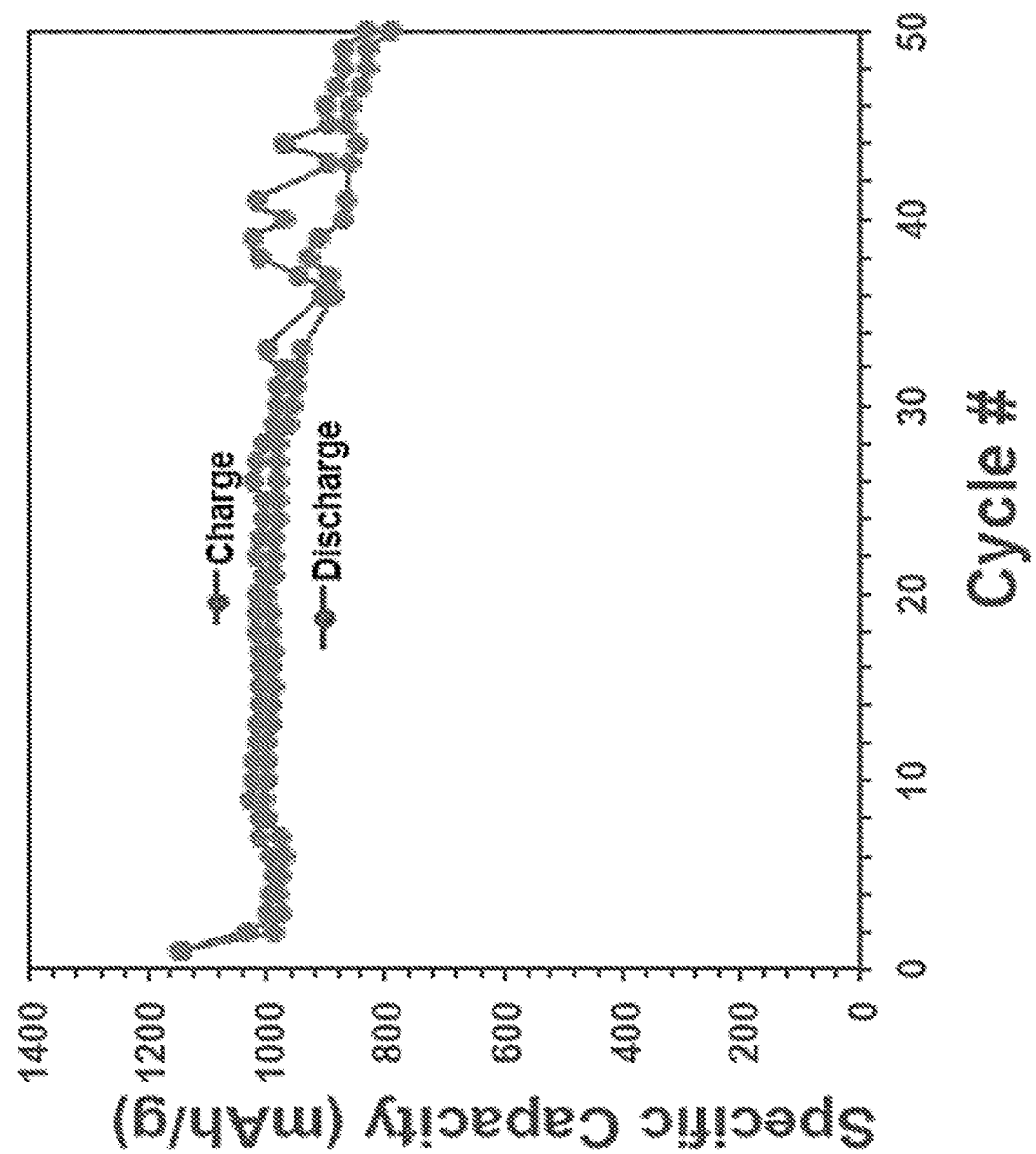
FIG. 5 illustrates a plot of specific capacities up to 50 cycles for an exemplary positive electrode provided herein.

Using a process similar to that described in Example 1, a fluid stock comprising sulfur to Super P in a ratio of about 8:2 is prepared. The fluid stock is electrosprayed onto a multi-layered substrate using a process similar to that in Example 1 until sulfur is loaded on the substrate at a concentration of about 4 mg/cm$^2$. The resultant electrode is manufactured into a cell, such as described in Example 1. Using a current rate of 6.4 mA (0.5 C), good capacities and retention are achieved (coin cells, with separator and lithium anode). FIG. 4 illustrates charge/discharge curves at various cycles and FIG. 5 illustrates specific capacities up to 50 cycles. As illustrated, initial capacities are about 1000 mAh/g or more, with good retention.

Example 3

Figure 6:
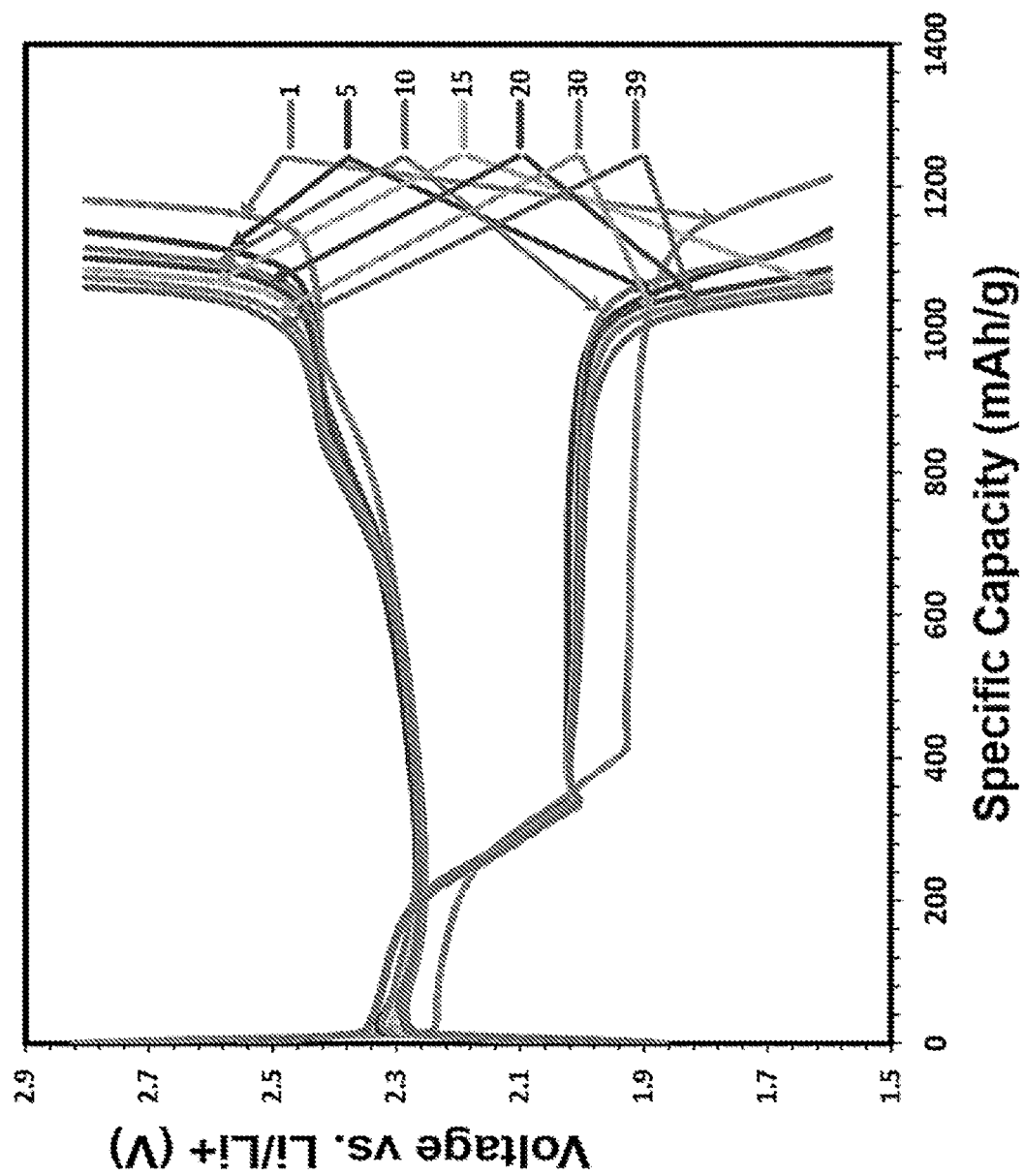
FIG. 6 illustrates charge/discharge curves at various cycles for an exemplary positive electrode provided herein.
Figure 7:
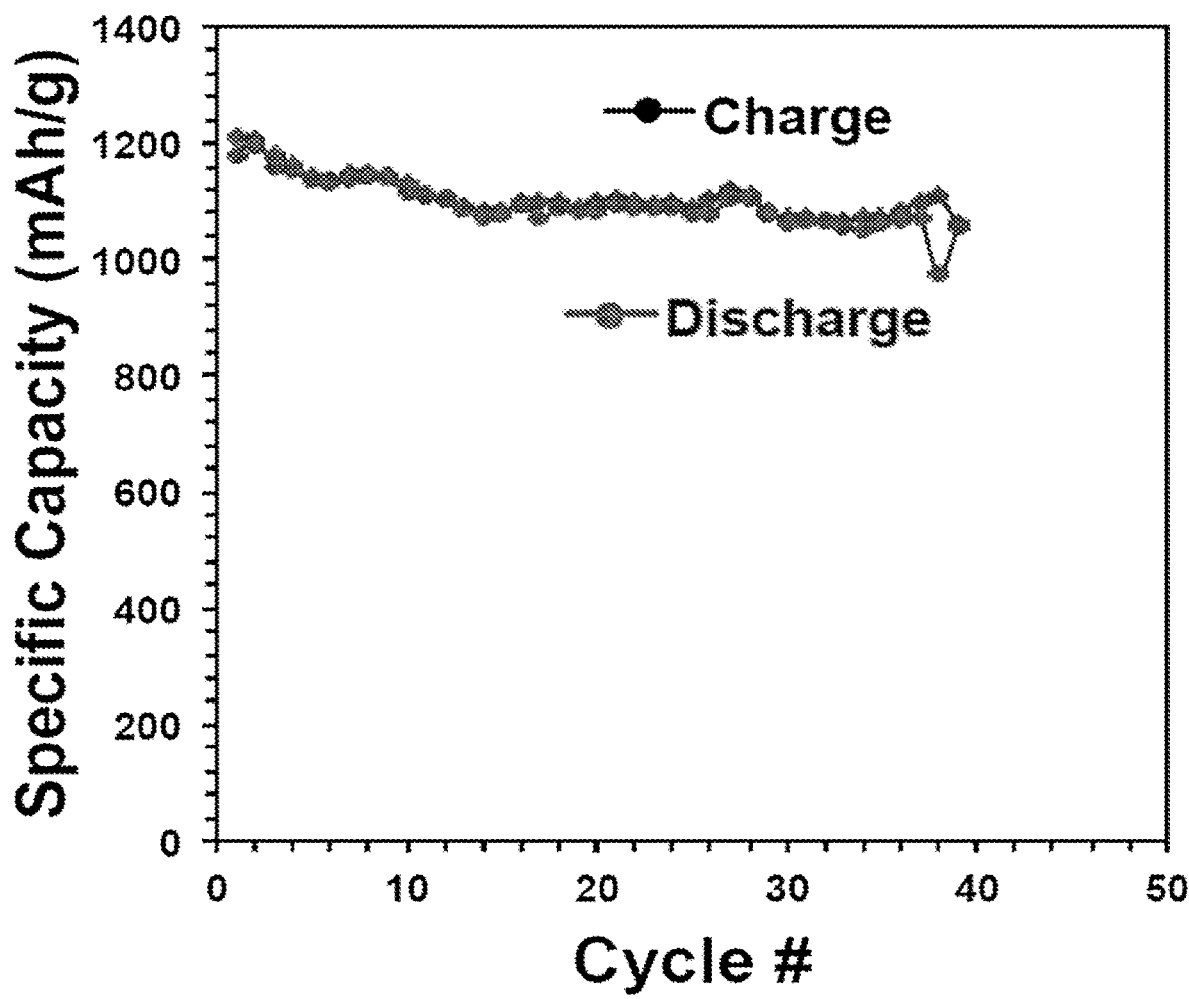
FIG. 7 illustrates a plot of specific capacities up to 40 cycles for an exemplary positive electrode provided herein.
Figure 8:
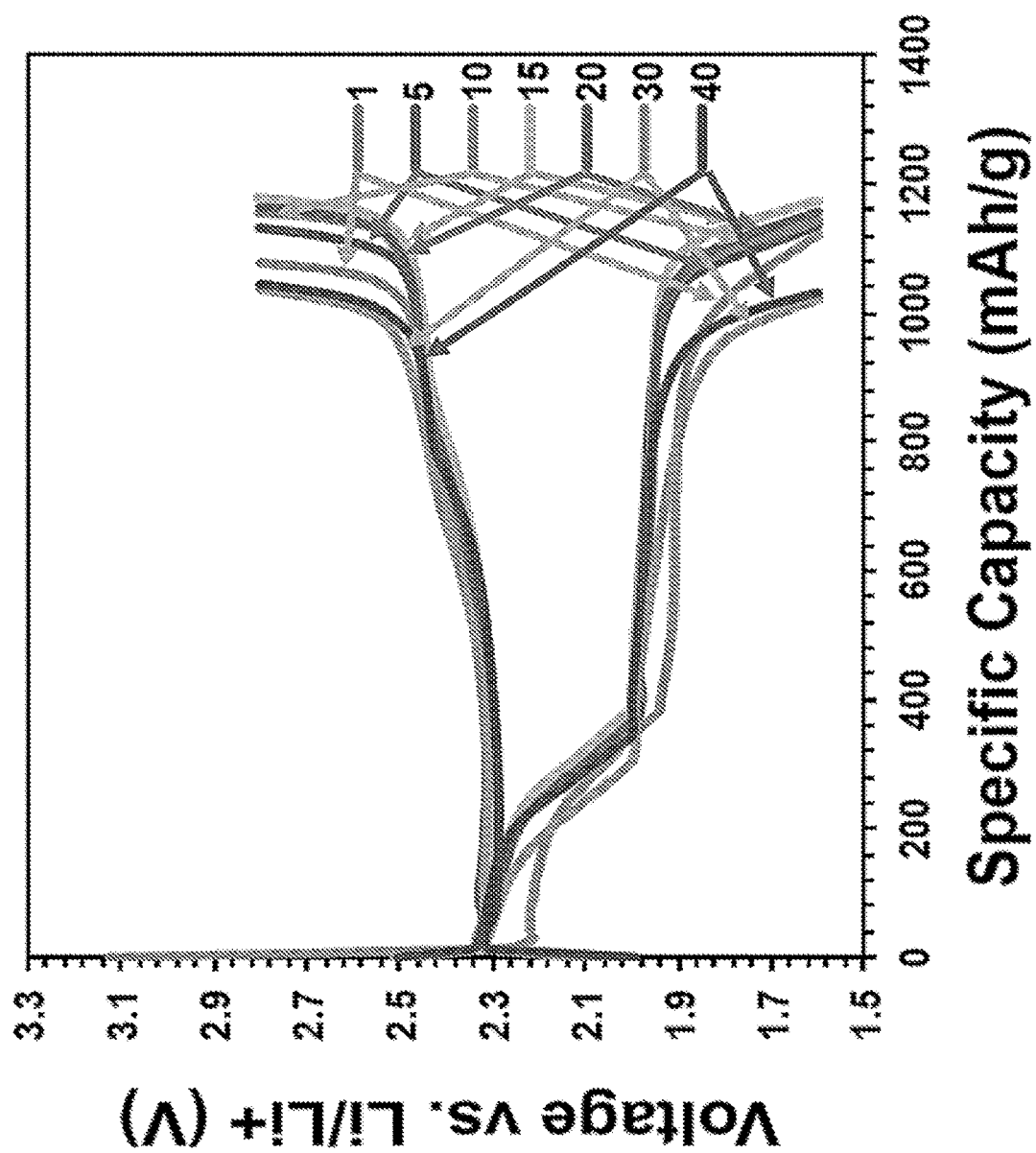
FIG. 8 illustrates charge/discharge curves at various cycles for an exemplary positive electrode provided herein.
Figure 9:
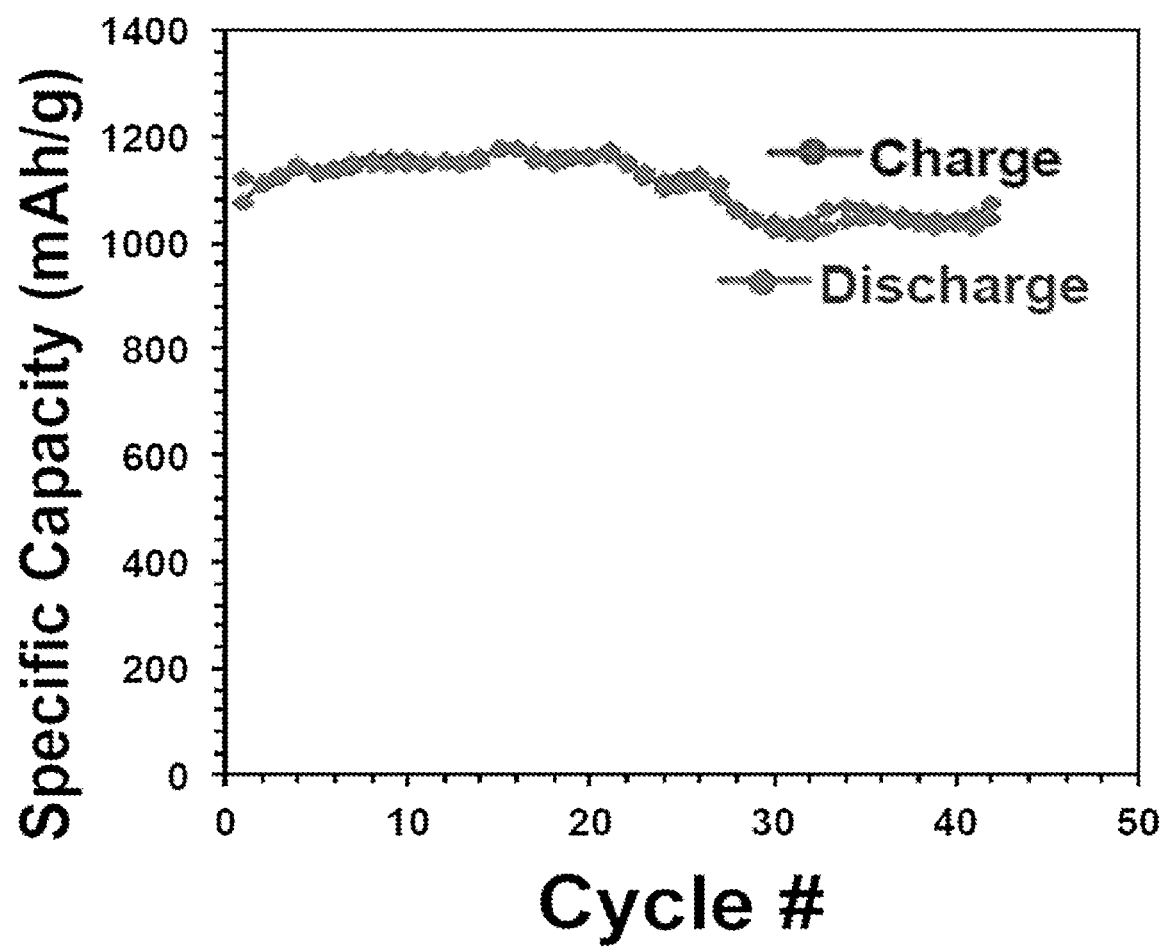
FIG. 9 illustrates a plot of specific capacities up to 40 cycles for an exemplary positive electrode provided herein.

An electrode is manufactured using a process similar to that described in Example 2. Using a similar current rate, initial specific capacities of about 1100-1200 mAh/g or more are achieved, with good retention. FIG. 6 illustrates charge/discharge curves at various cycles and FIG. 7 illustrates specific capacities up to 40 cycles. A similar electrode is manufactured using a sulfur loading of 5 mg/cm$^2$. FIG. 8 illustrates charge/discharge curves at various cycles and FIG. 9 illustrates specific capacities up to 40 cycles (at a current rate of 8.0 mA, 0.5 C).

Example 4

Figure 10:
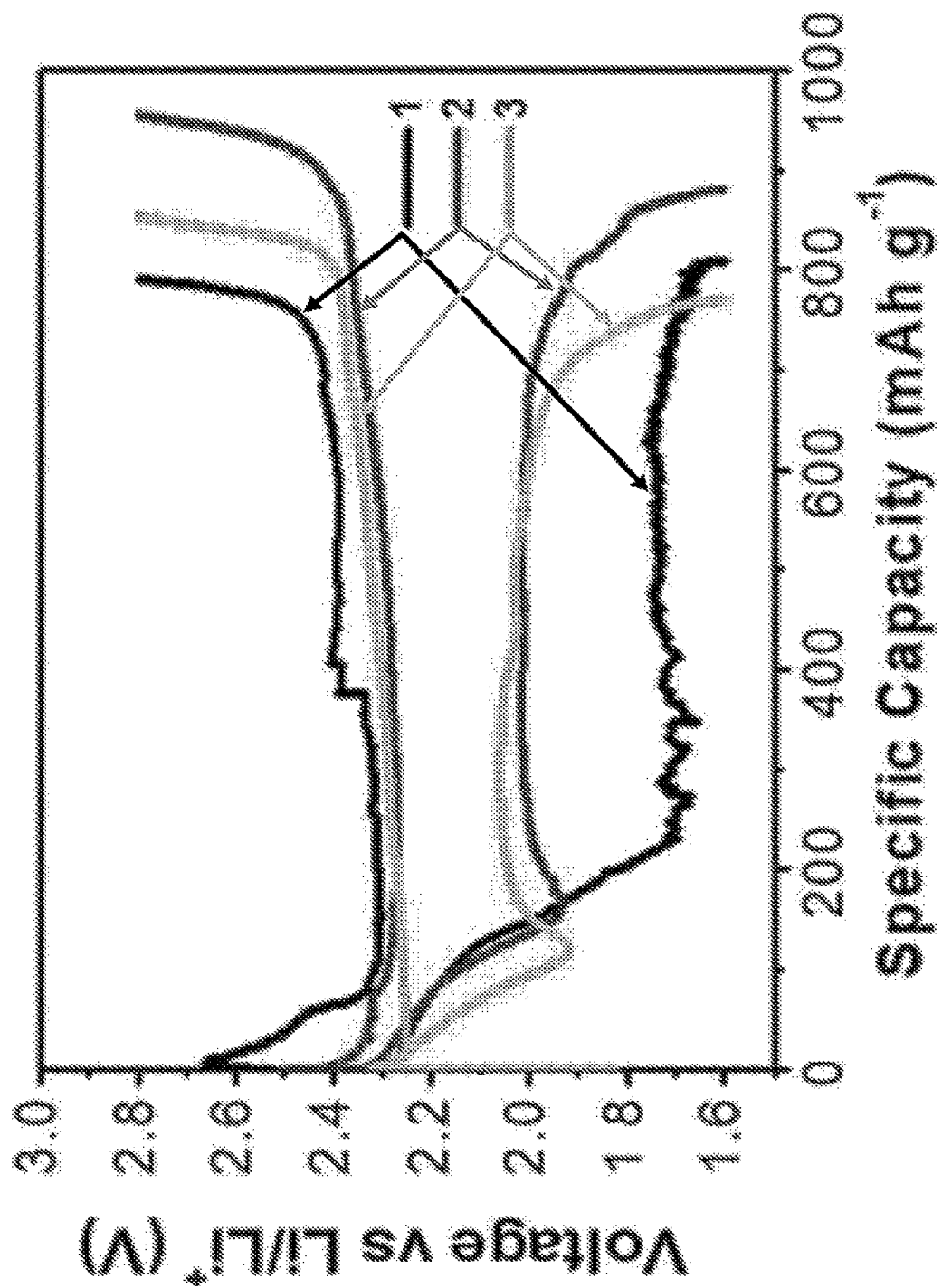
FIG. 10 illustrates charge/discharge curve of Li—S coin cell comprising an exemplary positive electrode provided herein.
Figure 11:
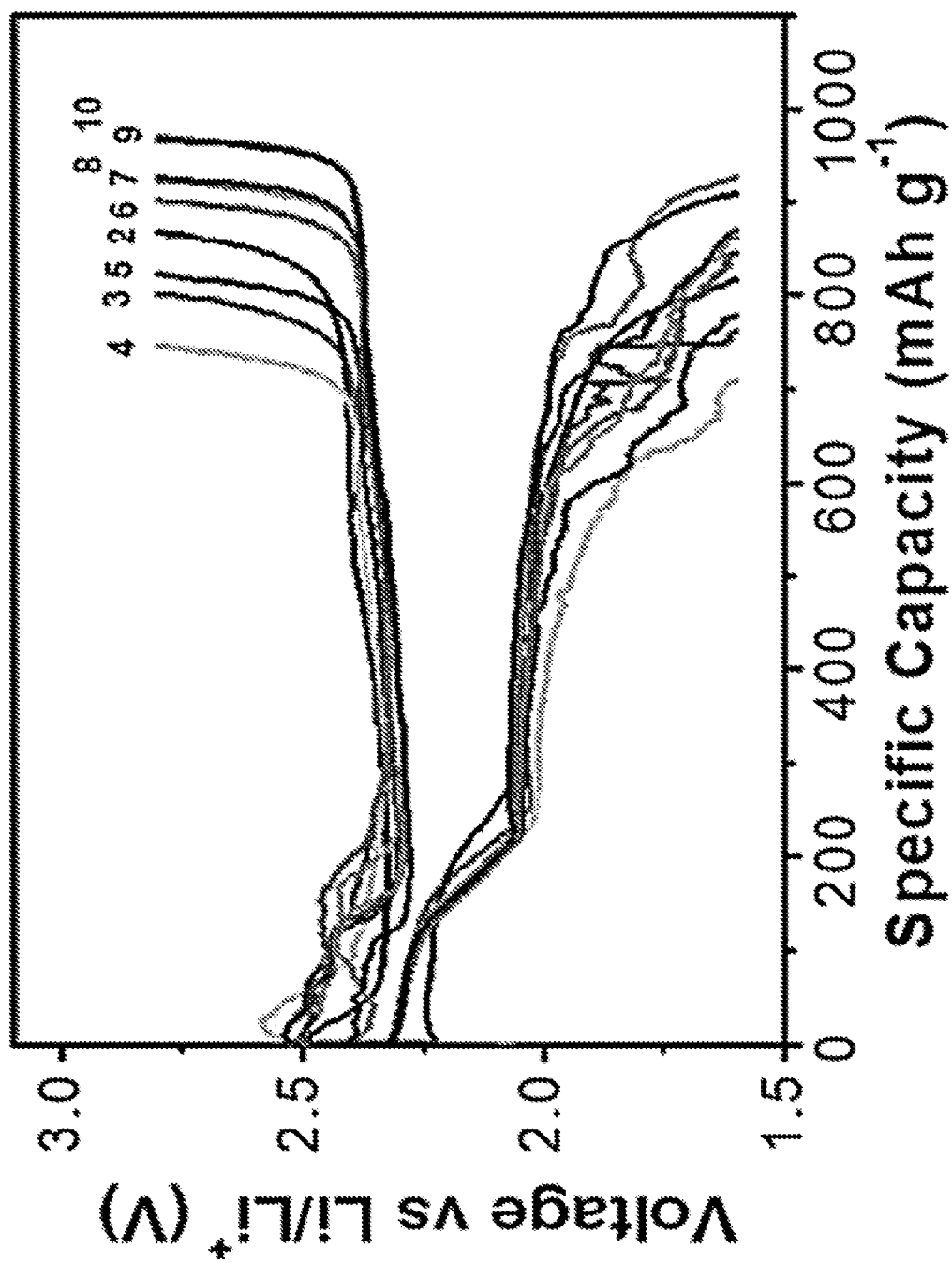
FIG. 11 illustrates charge/discharge curves of Li—S coin cell comprising an exemplary positive electrode provided herein.

Direct deposited electrodes for thin film (25 cm2) and coin cell (2 cm2) are prepared using electrospray processes, such as described in Example 1, using a porous carbon membrane as the substrate. Li—S battery coin cells with high loading of sulfur (12.4 mg and 29.5 mg) exhibit 700 to 900 mAh/g of capacity, even at very high sulfur loading. After 50 cycles, a capacity of at least 600 mAh/g is retained. FIG. 10 illustrates charge/discharge curve of Li—S coin cell with sulfur loading of 29.5 mg at 100 mA/g rate. FIG. 11 illustrates charge/discharge curves of Li—S coin cell with sulfur loading of 12.4 mg at 100 mA/g rate.

Example 5

Figure 12:
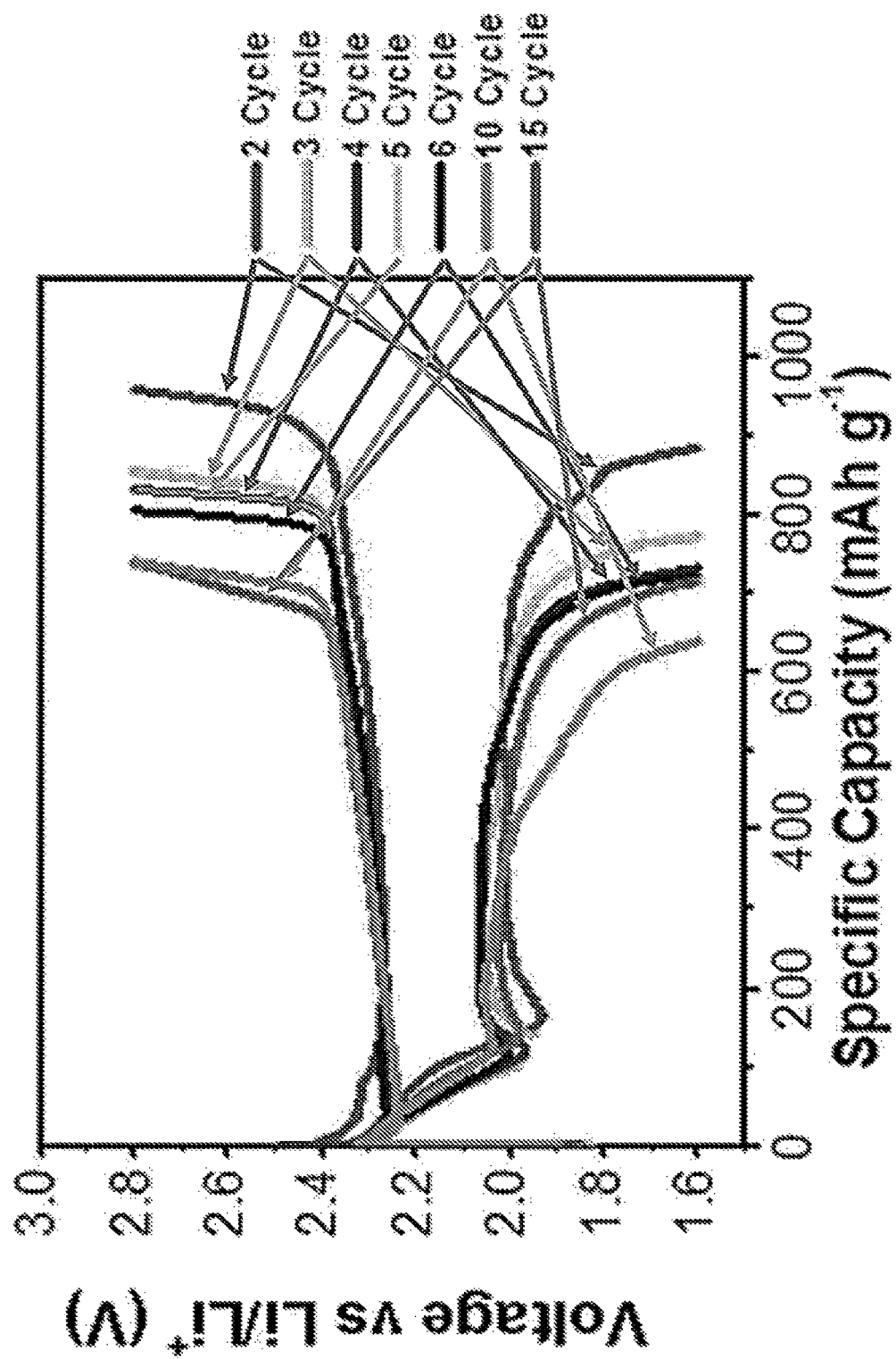
FIG. 12 illustrates charge/discharge cycling of an exemplary positive electrode provided herein.
Figure 13:
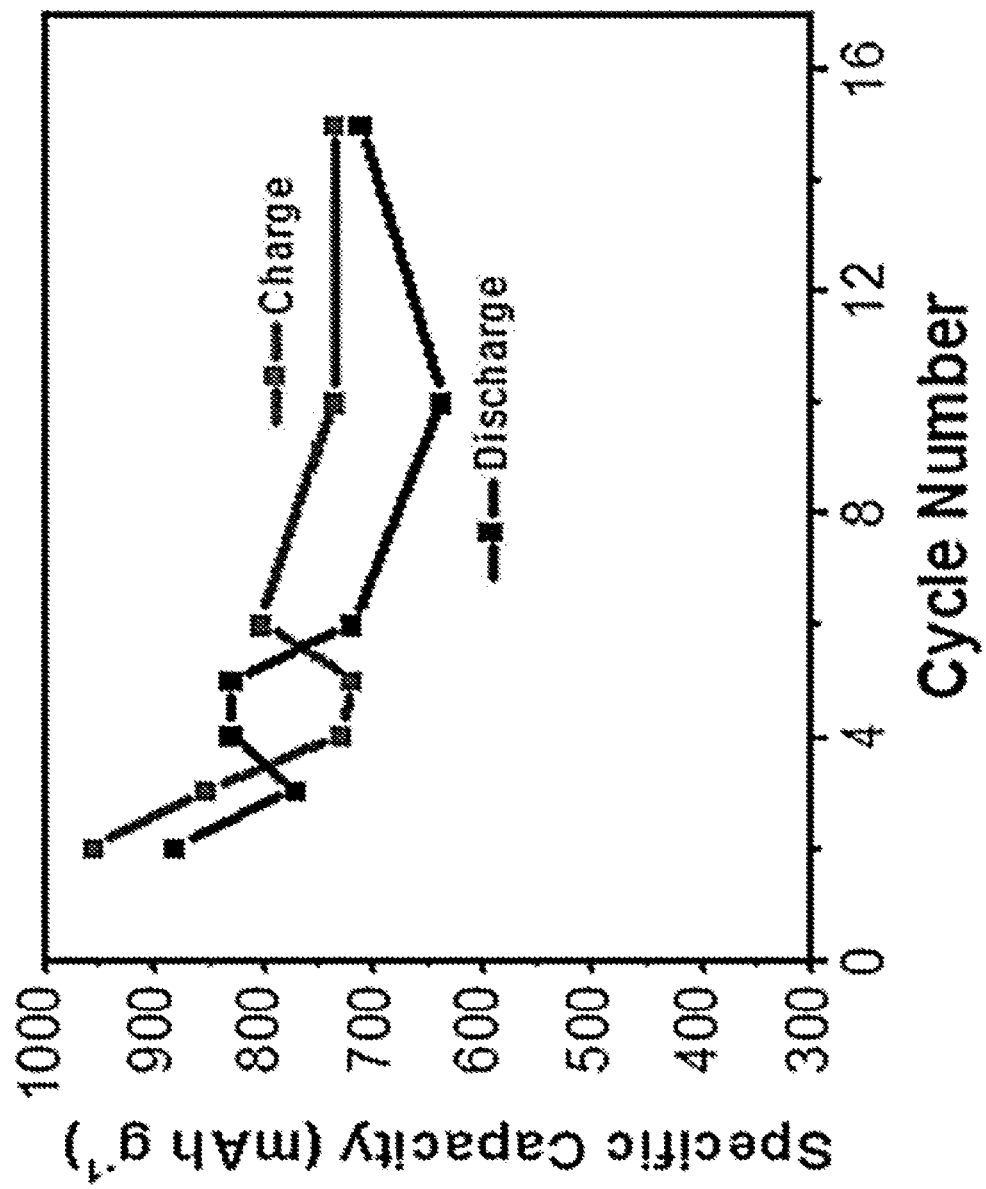
FIG. 13 illustrates a plot of capacities for an exemplary positive electrode provided herein.

Using samples similar to those described in Example 4, nanostructured carbon is added to the fluid stock. FIG. 12 illustrates charge/discharge cycling of an electrode with 29.5 mg sulfur with rGO (2%), exhibiting about 710 mAh/g of capacity after 16 cycles, using a charge rate of 100 mA/g. FIG. 13 illustrates the capacity of the cell at various cycles therefor.

Figure 14:
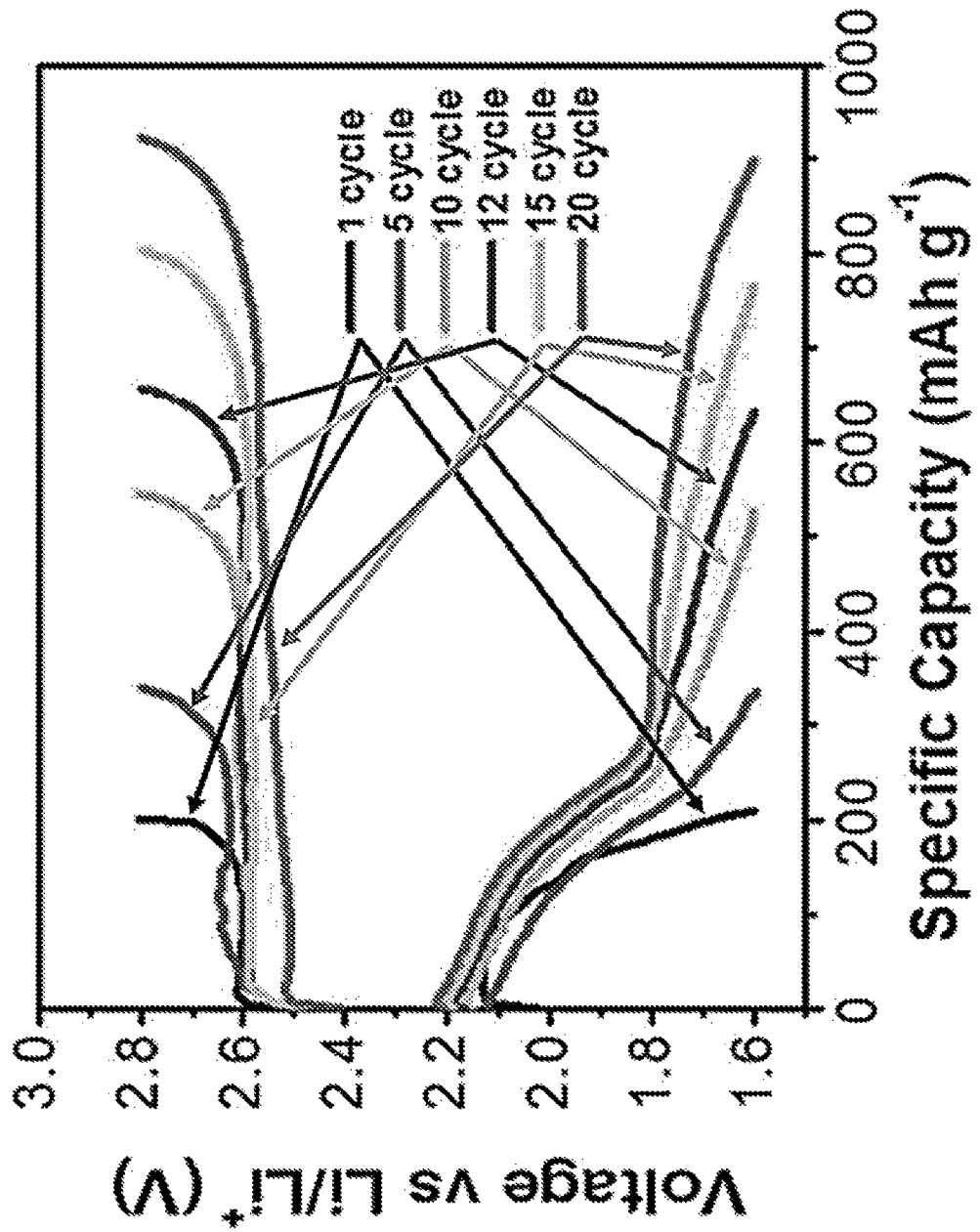
FIG. 14 illustrates charge/discharge cycling of an exemplary positive electrode provided herein.
Figure 15:
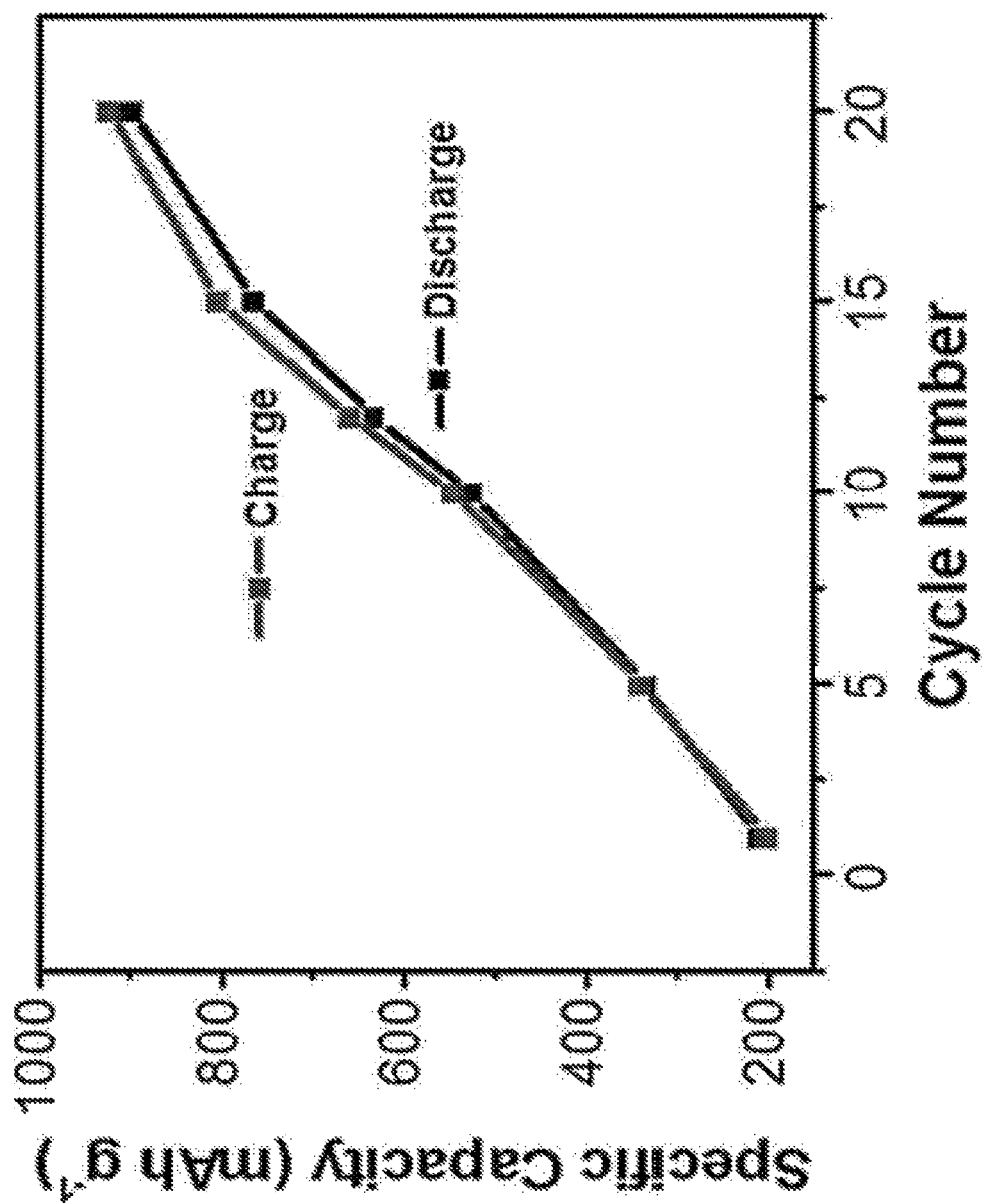
FIG. 15 illustrates a plot of the capacity of a cell comprising an exemplary positive electrode provided herein.

A similar electrode with 12 mg sulfur is prepared, demonstrating a capacity of about 900 mAh/g after 20 cycles. FIG. 14 illustrates charge/discharge cycling of an electrode with 12 mg sulfur with rGO (2%), using a charge rate of 417 mA/g. FIG. 15 illustrates the capacity of the cell at various cycles therefor.

Example 6

A first fluid stock is prepared according to a process similar to that described in Example 1, with the stock comprising sulfur and 2% carbon black. Using a process similar to that in Example 1, the sulfur is loaded on a carbon paper substrate having a microporous layer at an areal loading of about 4 mg/cm$^2$. A second (aqueous) fluid stock is prepared with graphene oxide (GO), which is similarly electrosprayed onto the substrate. A coin cell is then assembled using the prepared electrode, the electrode having an area of about 2 cm$^2$ with about 0.5 mg GO loaded thereon, in a manner similar to that described in Example 1.

An initial capacity (after preliminary pre-cycling) of over 900 mAh/g is observed, with good capacity retention observed (at 0.25 C). At 0.5 C, a similarly prepared cell has an initial capacity (after preliminary pre-cycling) of over 1000 mAh/g with good capacity retention. A similarly prepared electrode lacking the GO layer, however, had an initial capacity (after preliminary pre-cycling) of about 200 mAh/g less than the sample with the GO layer.

Similar samples are likewise prepared using mesoporous carbon and mesoporous carbon nanofiber substrate materials, with the GO comprising cathode having an initial capacity of about 200 mAh/g greater than the non-GO comprising cathode.

In various instances, by way of comparison to the embodiments and examples provided herein, use of lithium sulfur cathodes lacking a carbonaceous or conducting additive, such as in a configuration described herein, and using a substrate combined with sulfur using conventional processes have been demonstrated to have poor capacity and/or capacity retention, particularly at high sulfur loading. For example, lithium sulfur cathodes demonstrated in WO 2015/136197 (see, e.g., FIG. 6), which is incorporated by reference herein for such disclosure, demonstrate low capacity and rapid capacity decline.

Example 7

Using a process similar to that described in in the Examples, film materials are attempted to be prepared using graphene oxide on a naked substrate. A system using graphene oxide (0.75 wt %) in water is electrosprayed with and without a high velocity gas stream. Similar conditions are utilized, with a working voltage of 25 kV, a distance from the nozzle to the collector of 20 cm, and a flow rate of 0.07 mL/min. As illustrated in FIG. 18 (panel B), after just 1 minute, the droplets coalesce and begin to run when no gas is utilized, while, as illustrated in FIG. 18 (panel A), good film formation is observed when spraying the stock with a high velocity gas.

What is claimed is:

1. A process for producing an electrode, the process comprising:
   (a) injecting a first electrostatically charged fluid stock into a gas stream to form a first plume comprising a plurality of first particles, the first electrostatically charged fluid stock comprising a first liquid, sulfur, and a first additive, the first additive comprising a plurality of first carbonaceous inclusions, and
   (b) collecting the plurality of the first particles onto a porous carbon substrate to form a porous substrate.

2. The process of claim 1, wherein the first additive comprises graphene, graphene oxide, reduced graphene oxide, carbon nanotubes, graphene nanoribbons, carbon nanofibers, mesoporous carbon nanostructures, or any combination thereof.

3. The process of claim 1, wherein the first additive comprises graphene or a graphene analog.

4. The process of claim 3, wherein the graphene analog is graphene oxide, reduced graphene oxide, or a combination thereof.

5. The process of claim 1, further comprising:
   (c) injecting a second electrostatically charged fluid stock into a second gas stream to form a second plume, the second plume comprising a plurality of second particles, the second electrostatically charged fluid stock comprising a second liquid, a second additive and/or optionally sulfur, the second additive comprising a plurality of the second carbonaceous inclusions, and
   (d) collecting the plurality of the second particles onto the porous substrate.

6. The process of claim 1, wherein the porous substrate comprises at least two layers or domains, wherein a first layer or domain is a course porous layer or domain, and the second layer or domain is a dense porous layer or domain.

7. The process of claim 1, wherein the electrode is binder free.

8. The process of claim 1, wherein the electrode comprises a sulfur loading of at least 5 mg/cm$^2$.

9. The process of claim 1, wherein the electrode comprises a sulfur loading of 10 to 30 mg/cm$^2$.

10. The process of claim 1, wherein the porous substrate is a macroporous substrate comprising a macroporous domain and a mesoporous and/or microporous domain, wherein the mesoporous and/or microporous domain are formed by at least partially filling the macroporous substrate with the additive.

11. The process of claim 1, further comprising collecting a first deposition of a plurality of the first particles and a second deposition of a plurality of the first particles on the porous carbon substrate.

12. The process of claim 1, wherein the sulfur of the sulfur deposition is allowed to infuse into the porous carbon substrate.

13. The process of claim 1, wherein the sulfur is uniformly deposited on the surface of the carbon substrate, and wherein a standard deviation of the concentration of the sulfur and/or additive on the surface is less than 100% of the average concentration.

14. The process of claim 12, wherein a standard deviation of the concentration of the sulfur and/or additive on the surface is less than 30% of the average concentration.

15. The process of claim 1, wherein the electrode comprises a first surface and a second surface and sulfur is disposed on at least one of the first and second surface.

16. The process of claim 1, wherein porous substrate is an asymmetric porous substrate comprising a course porous layer with less density, larger and/or more pores and a dense porous layer with higher density, fewer and/or smaller pores.

17. The process of claim 1, wherein the porous carbon substrate is a multilayered porous carbon substrate comprising a sulfur infused asymmetric carbon substrate, and wherein the porous carbon substrate comprises multiple layers or domains.

18. The process of claim 1, wherein the plume comprises a plurality of particles and/or droplets having an average dimension of less than 1 micron.

19. A process for producing an electrode, the process comprising:
   producing a first plume from a first fluid stock and disposing the first plume on a porous carbon substrate;
   producing a second plume from a second fluid stock and disposing the second plume on the porous carbon substrate;
   wherein the first fluid stock comprises a sulfur compound, a carbonaceous additive, or conductive additive; and the second fluid stock comprises a sulfur compound, a carbonaceous or conductive additive; and
   wherein the first fluid stock is different from the second fluid stock and wherein at least one of the first and second fluid stock comprising a sulfur compound.

* * * * *